(12) United States Patent
Matsuoka

(10) Patent No.: US 10,750,193 B2
(45) Date of Patent: Aug. 18, 2020

(54) IMAGE PROCESSING APPARATUS AND IMAGE PROCESSING METHOD

(71) Applicant: CANON KABUSHIKI KAISHA, Tokyo (JP)

(72) Inventor: Masaaki Matsuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 16/178,808

(22) Filed: Nov. 2, 2018

(65) Prior Publication Data

US 2019/0141341 A1    May 9, 2019

(30) Foreign Application Priority Data

Nov. 6, 2017 (JP) ................ 2017-214186

(51) Int. Cl.
| | | |
|---|---|---|
| *H04B 1/66* | (2006.01) | |
| *G06K 9/00* | (2006.01) | |
| *H04N 19/169* | (2014.01) | |
| *H04N 19/63* | (2014.01) | |
| *H04N 13/282* | (2018.01) | |
| *H04N 19/597* | (2014.01) | |
| *H04N 13/128* | (2018.01) | |
| *H04N 19/186* | (2014.01) | |

(52) U.S. Cl.
CPC ....... *H04N 19/1883* (2014.11); *H04N 13/128* (2018.05); *H04N 13/282* (2018.05); *H04N 19/186* (2014.11); *H04N 19/597* (2014.11); *H04N 19/63* (2014.11)

(58) Field of Classification Search
CPC ............. H04N 19/1883; H04N 19/186; H04N 13/128; H04N 19/597; H04N 13/282; H04N 19/63; H04N 13/218; H04N 13/106
See application file for complete search history.

(56) References Cited

U.S. PATENT DOCUMENTS

| | | | | |
|---|---|---|---|---|
| 2005/0123167 A1* | 6/2005 | Maeno | .................... | G06T 1/005 382/100 |
| 2005/0196060 A1* | 9/2005 | Wang | .................... | H04N 19/63 382/240 |
| 2005/0286759 A1* | 12/2005 | Zitnick, III | .......... | G06T 15/205 382/154 |
| 2006/0008003 A1* | 1/2006 | Ji | .......................... | H04N 19/63 375/240.11 |
| 2006/0008038 A1* | 1/2006 | Song | .................... | H04N 19/63 375/350 |

FOREIGN PATENT DOCUMENTS

JP    2015-171097 A    9/2015

* cited by examiner

*Primary Examiner* — Howard D Brown, Jr.
(74) *Attorney, Agent, or Firm* — Cowan, Liebowitz & Latman, P.C.

(57) ABSTRACT

An image processing apparatus divides a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components. As for the plurality of second images, the image processing apparatus then encodes the sub-band that includes high-frequency components. As for the base image, the image processing apparatus encodes the sub-band that does not include high-frequency components.

27 Claims, 35 Drawing Sheets

FIG. 4
DECOMPOSITION LEVEL 0
0LL
701
DECOMPOSITION LEVEL 1
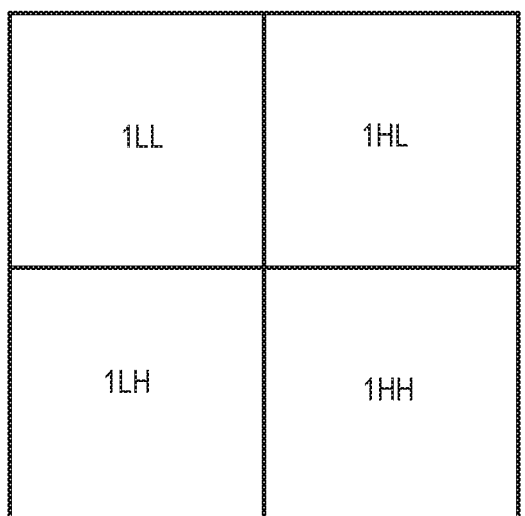
702
DECOMPOSITION LEVEL 2
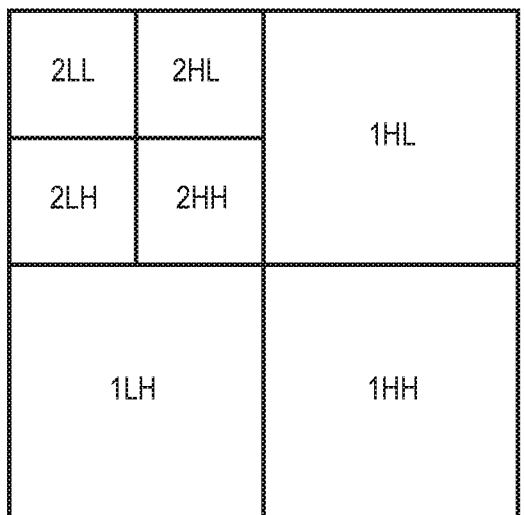
703
DECOMPOSITION LEVEL 3
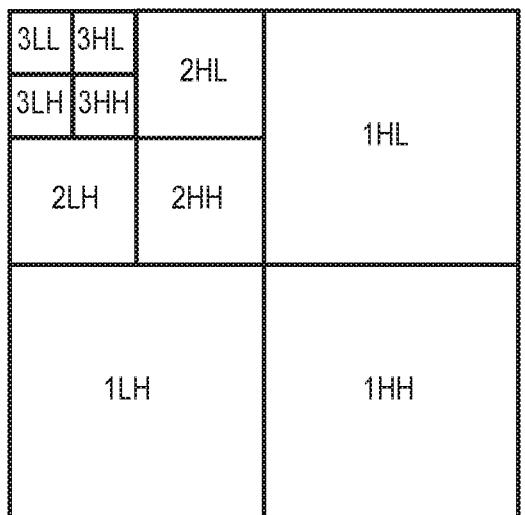
704

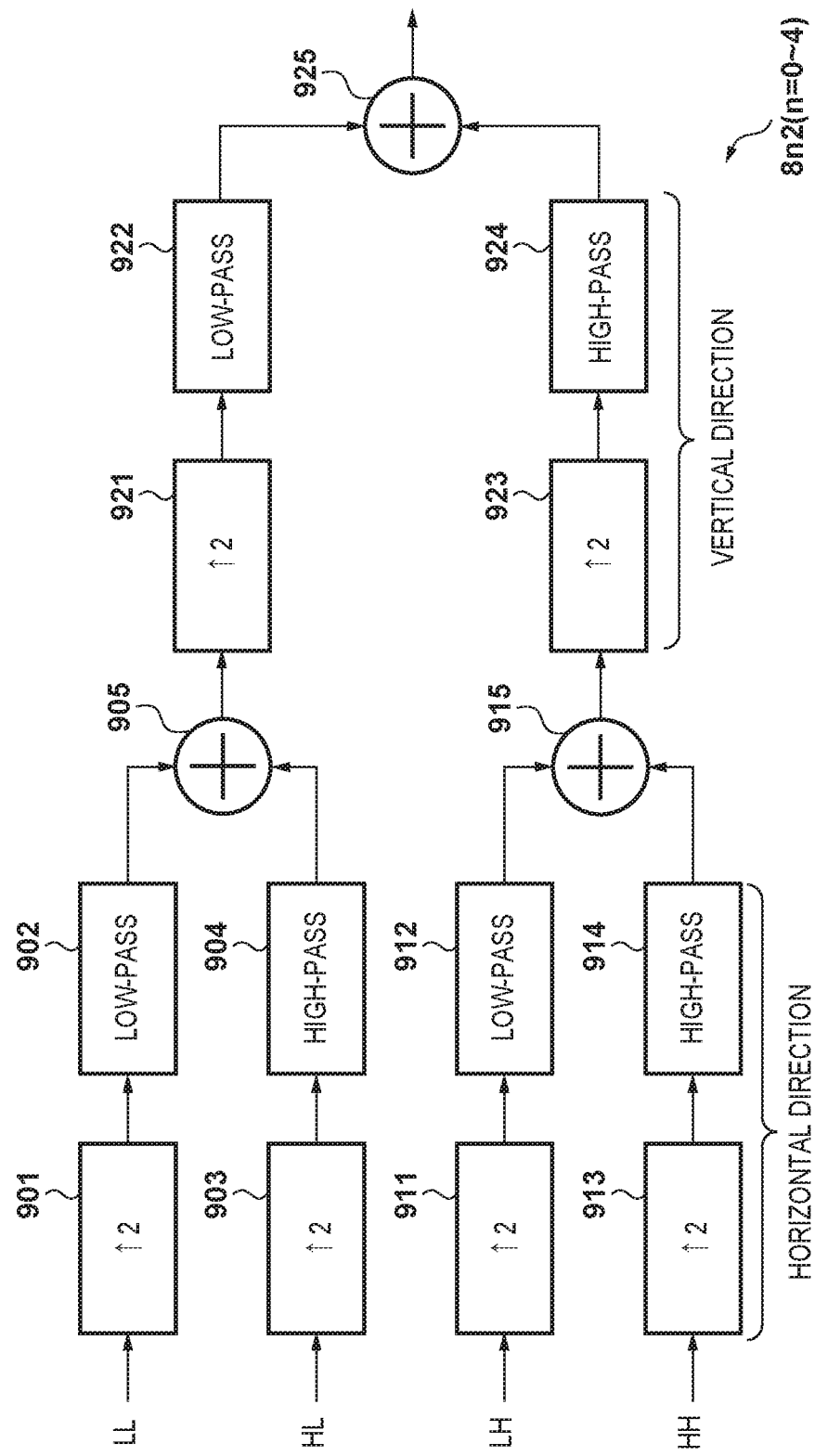

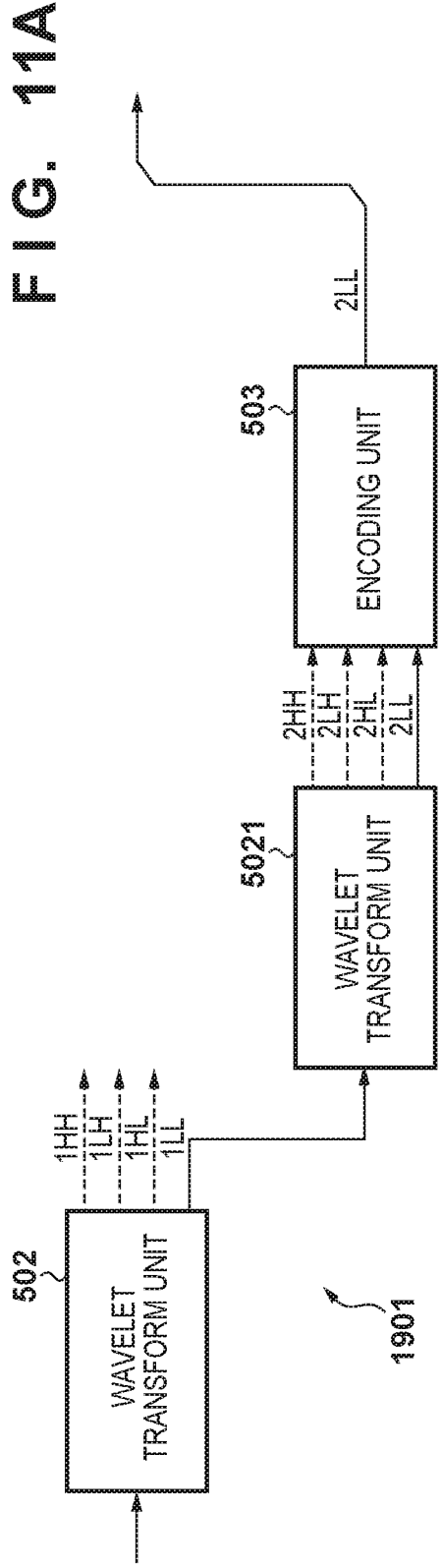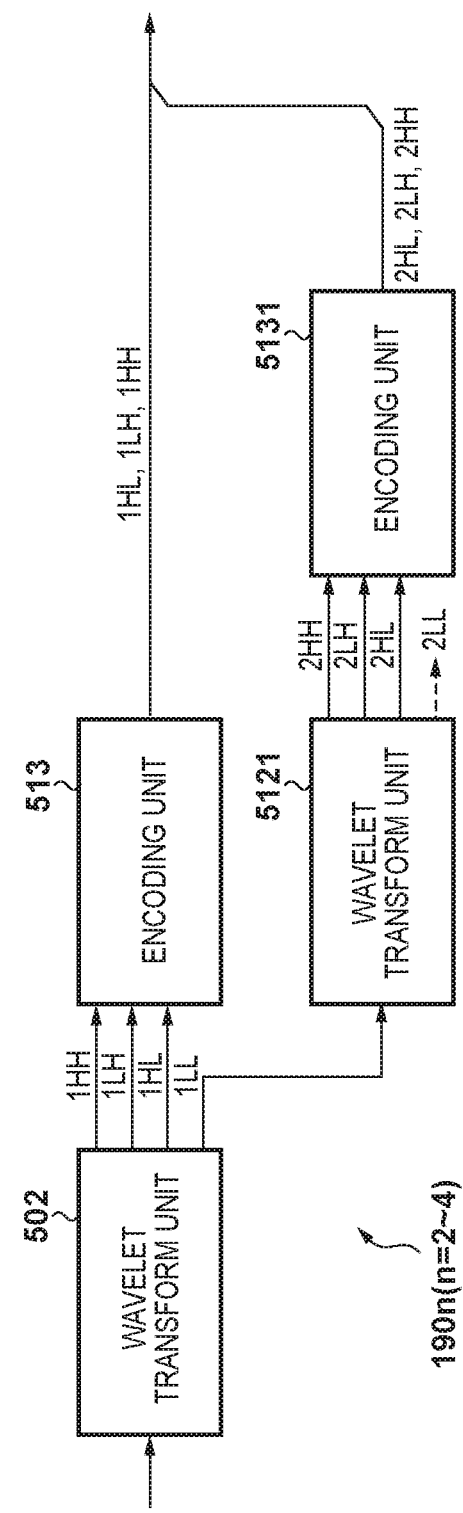

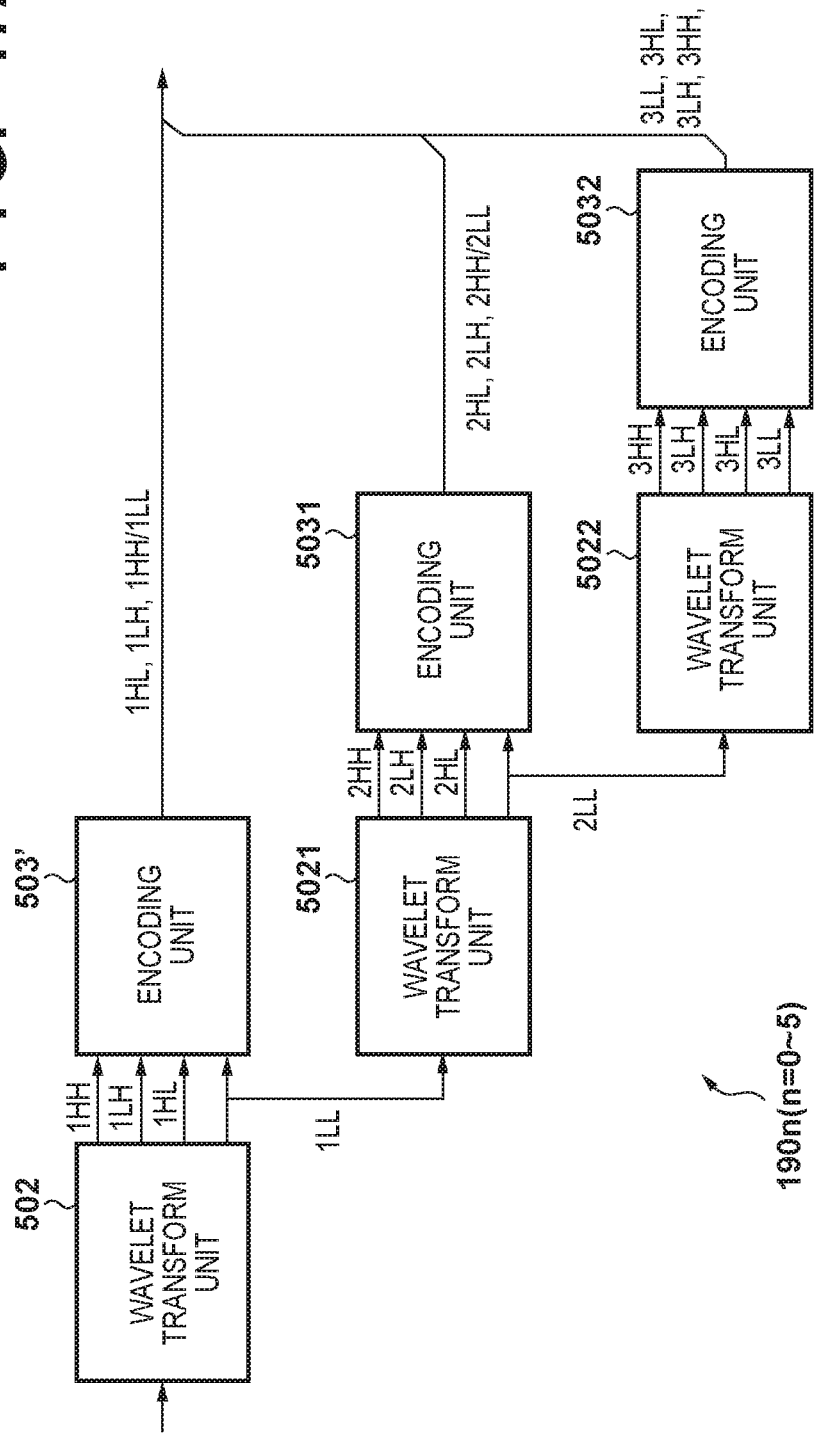

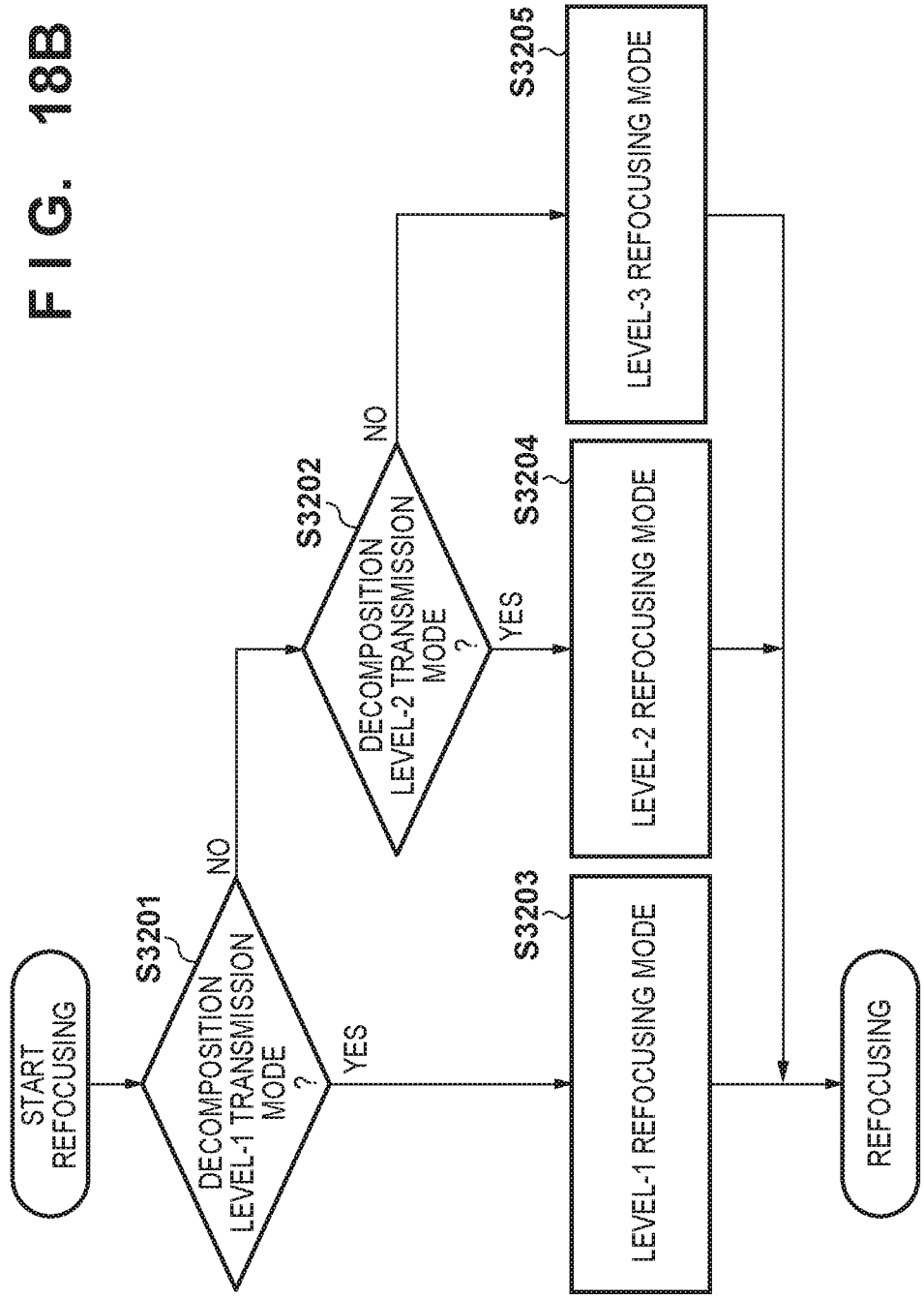

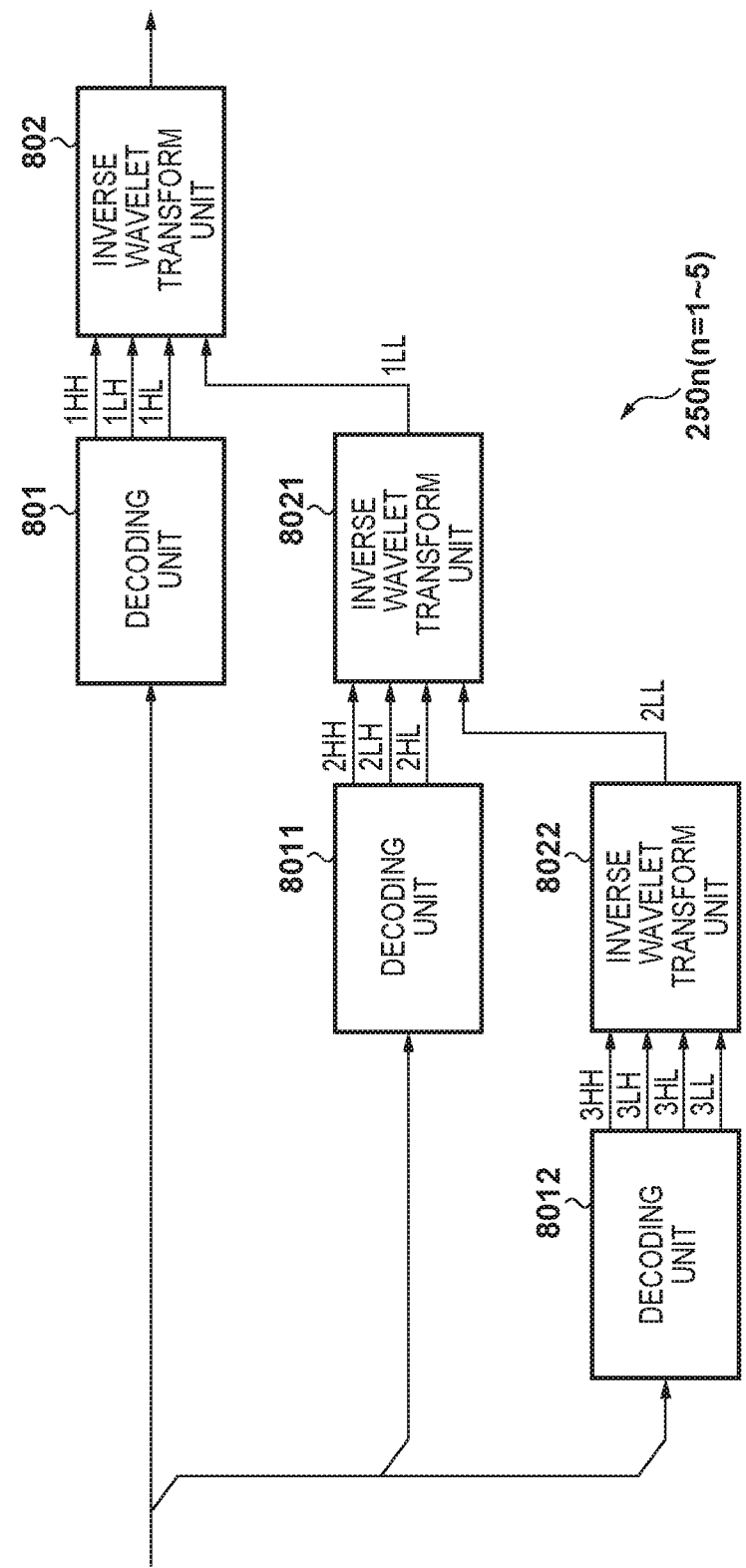

$$Df = \frac{r \cdot Av \cdot Z^2}{f^2 + r \cdot Av \cdot Z}$$

$$Db = \frac{r \cdot Av \cdot Z^2}{f^2 - r \cdot Av \cdot Z}$$

$$D = D_f + D_b$$

Df = FRONT DEPTH OF FIELD
Db = BACK DEPTH OF FIELD
D = DEPTH OF FIELD
r = PERMISSIBLE DIAMETER OF CIRCLE OF CONFUSION
Av = APERTURE VALUE
Z = DISTANCE TO SUBJECT
f = FOCAL LENGTH

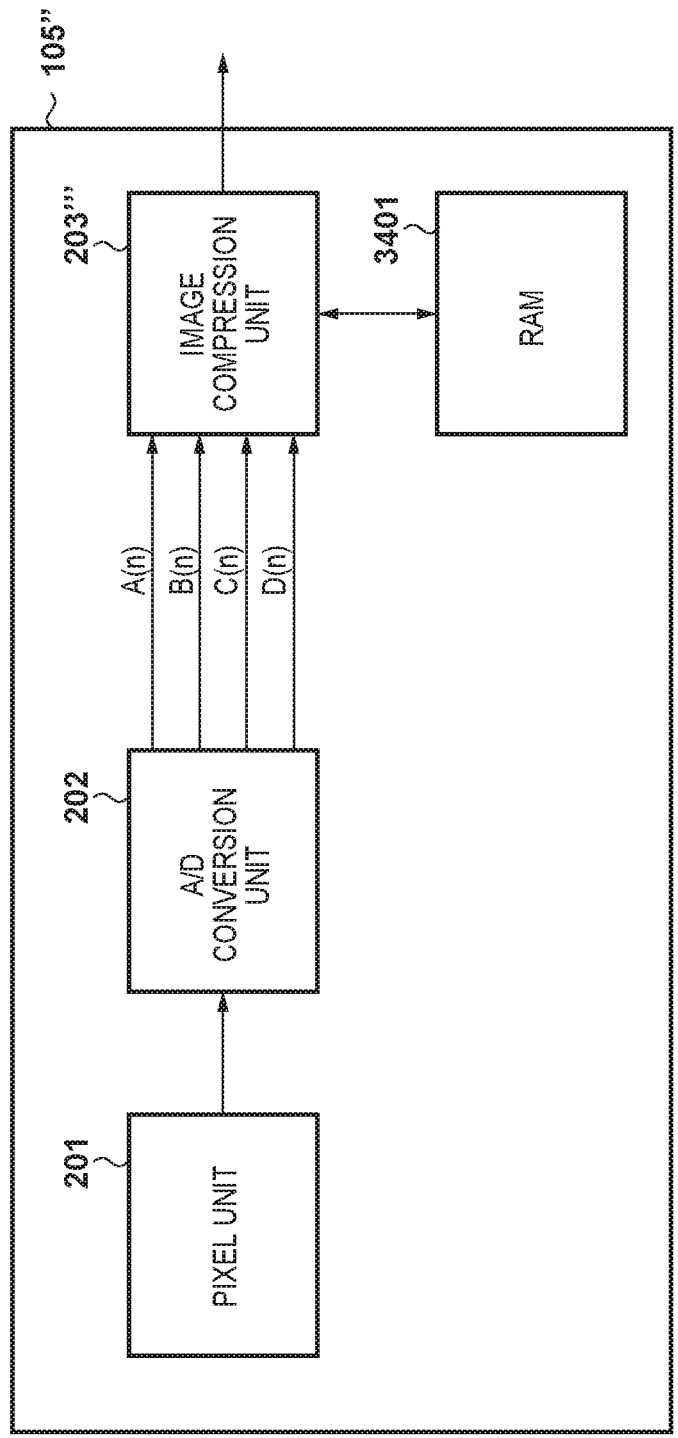

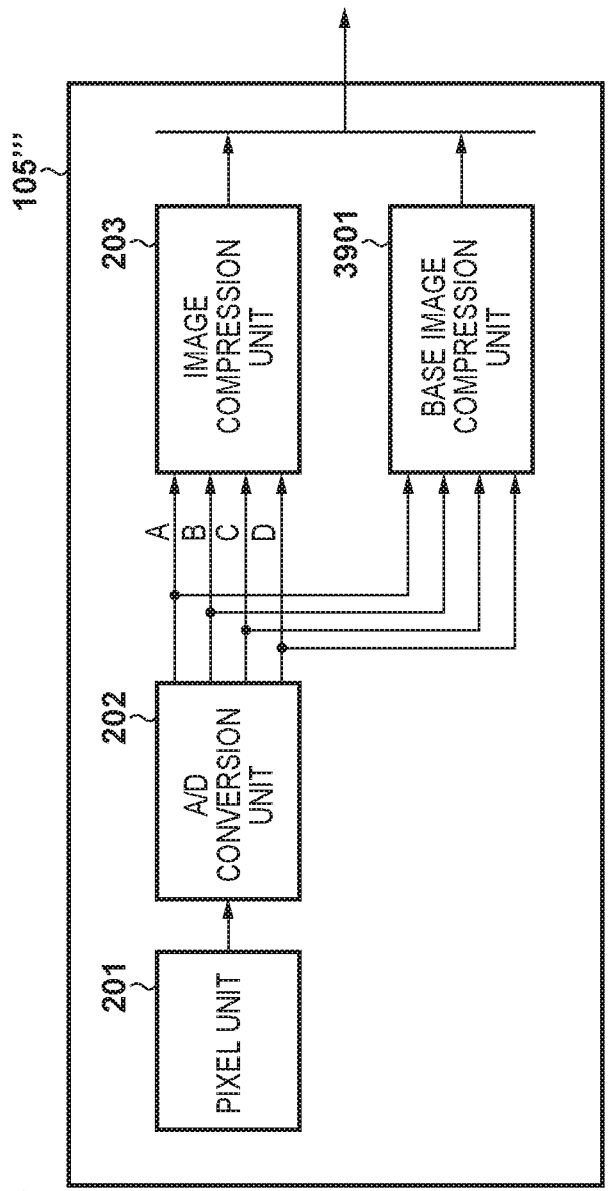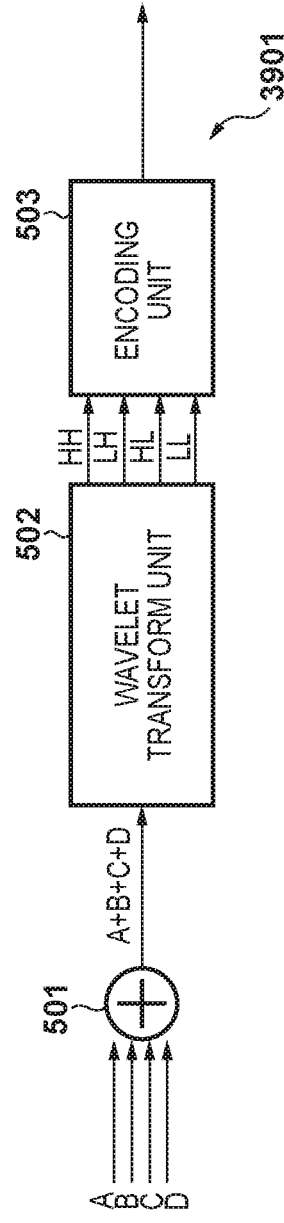
FIG. 24A
FIG. 24B

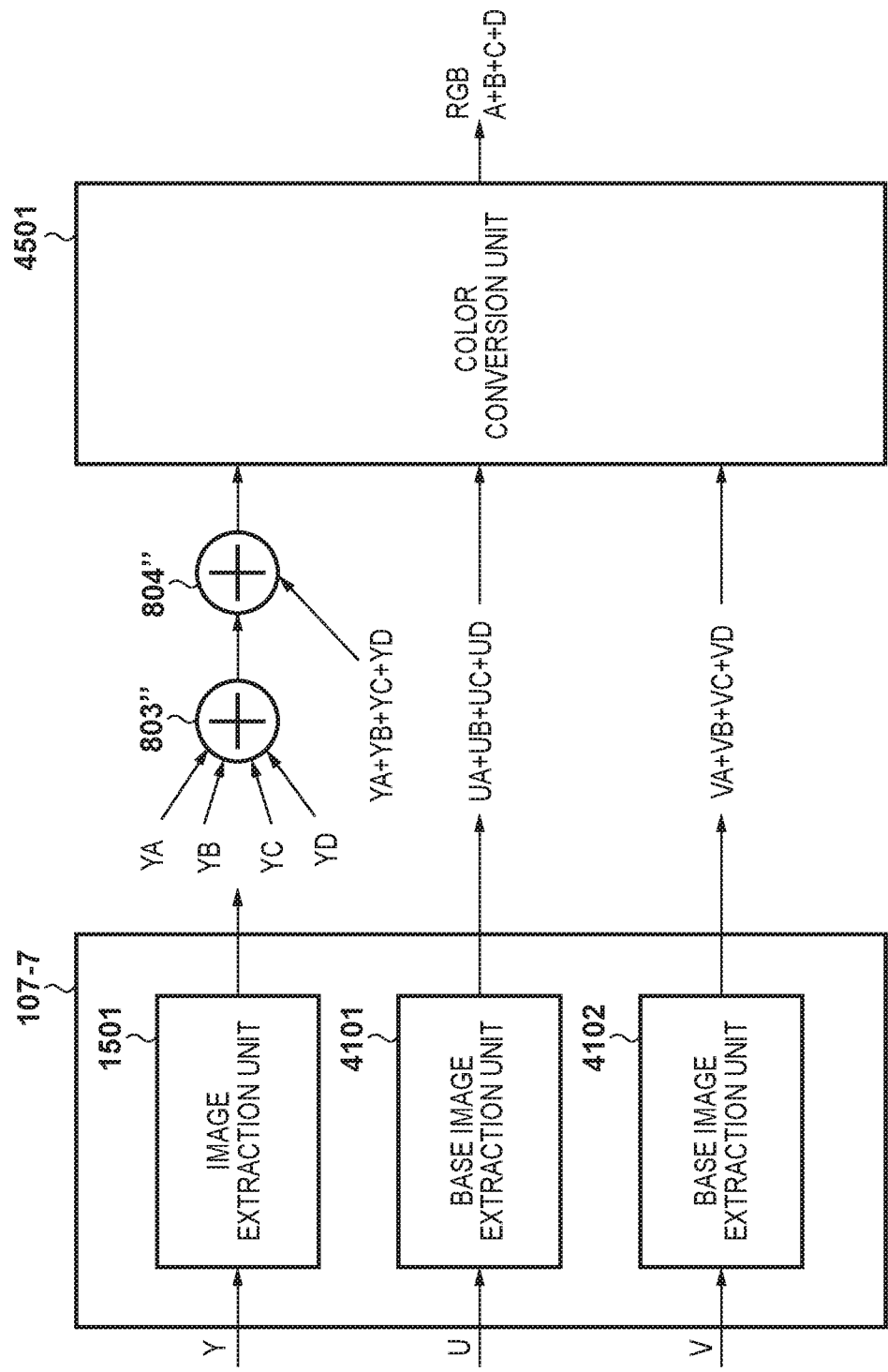

IMAGE PROCESSING APPARATUS AND IMAGE PROCESSING METHOD

BACKGROUND OF THE INVENTION

Field of the Invention

The present invention relates to an image processing apparatus and an image processing method, and relates particularly to an image processing technique associated with multi-viewpoint images.

Description of the Related Art

Images (multi-viewpoint images) that are obtained by capturing images of the same subject from a plurality of viewpoints, such as those obtained through stereoscopic photographing or multi-angle photographing, are used to provide stereoscopic vision or to generate an image from a changed viewpoint or in-focus distance, for example. Since multi-viewpoint images are a group of images with the same number of frames as that of viewpoints, the amount of data thereof also increases with an increase in the number of viewpoints.

Japanese Patent Laid-Open No. 2015-171097 discloses that, instead of transmitting all data of a plurality of images (sub-images) that constitute multi-viewpoint images, data of an image obtained by calculating an arithmetic average of the sub-images and data of a region of interest (ROI) within each of the sub-images are transmitted.

The technique disclosed in Japanese Patent Laid-Open No. 2015-171097 can realize refocusing in the ROI while reducing the amount of data to be transmitted. However, the image region that can be subjected to refocusing is limited to the ROI.

SUMMARY OF THE INVENTION

The present invention provides a technique for reducing the amount of data of multi-viewpoint images while ensuring flexibility in image processing using the multi-viewpoint images.

According to an aspect of the present invention, there is provided an image processing apparatus comprising: a processor that executes a program stored in a memory and functions as: a dividing unit configured to divide a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components; and an encoding unit configured to encode the plurality of second images and the base image, wherein, as for the plurality of second images, the encoding unit encodes the sub-band that includes high-frequency components, and, as for the base image, the encoding unit encodes the sub-band that does not include high-frequency components.

According to another aspect of the present invention, there is provided an image processing apparatus comprising: a processor that executes a program stored in a memory and functions as: a converting unit configured to convert, to a luminance component and a color difference component, a base image corresponding to a plurality of first images captured from different viewpoints, and a plurality of second images each corresponding to one or more of the plurality of first images; a dividing unit configured to divide the luminance component and the color difference component into a plurality of sub-bands including a sub-band that includes high-frequency components and a sub-band that does not include high-frequency components; and an encoding unit configured to encode the plurality of second images and the base image, wherein, as for the base image, the encoding unit encodes the plurality of sub-bands of the color difference component, and encodes the sub-band that does not include high-frequency components of the luminance component, and as for the plurality of second images, the encoding unit does not encode the color difference component, and encodes the sub-band that includes high-frequency components of the luminance component.

According to a further aspect of the present invention, there is provided an image processing apparatus comprising: a processor that executes a program stored in a memory and functions as: an acquiring unit configured to acquire encoded data of a sub-band that does not include high-frequency components of a base image corresponding to a plurality of first images captured from different viewpoints, and encoded data of a sub-band that includes high-frequency components of a plurality of second images each corresponding to one or more of the plurality of first images; a generating unit configured to generate a refocused image using the plurality of first images that have been restored using the encoded data of the plurality of second images; and an adding unit configured to add the refocused image to the base image obtained by decoding the encoded data of the base image.

According to another aspect of the present invention, there is provided an image capture apparatus comprising: an image sensor comprising a plurality of photoelectric conversion units configured to receive a light beam from an optical system and output a plurality of analog image signals from different viewpoints; an image processing apparatus configured to encode a base image and a plurality of second images, based on a plurality of first images output from the image sensor, and a recording unit configured to record, to a memory, encoded data that has been encoded by the image processing apparatus, the image processing apparatus comprising: a processor that executes a program stored in a memory and functions as: a dividing unit configured to divide the base image corresponding to a plurality of first images captured from different viewpoints, and the plurality of second images each corresponding to one or more of the plurality of first images, into a plurality of sub-bands including a sub-band that includes high-frequency components and a sub-band that does not include high-frequency components; and an encoding unit configured to encode the plurality of second images and the base image, wherein, as for the plurality of second images, the encoding unit encodes the sub-band that includes high-frequency components, and, as for the base image, the encoding unit encodes the sub-band that does not include high-frequency components.

According to a further aspect of the present invention, there is provided an image sensor comprising: a first semiconductor substrate comprising a plurality of photoelectric conversion units configured to receive a light beam from an optical system and output a plurality of analog image signals from different viewpoints; and a second semiconductor substrate comprising an image processing apparatus configured to encode a base image and a plurality of second images, the base image and the plurality of second images being generated based on the plurality of analog image signals, the first semiconductor substrate and the second semiconductor substrate being stacked together, the image processing apparatus comprising: a processor that executes a program stored in a memory and functions as: a dividing unit configured to divide the base image corresponding to a plurality of first images captured from different viewpoints, and the plurality of second images each corresponding to one or more of the plurality of first images, into a plurality of sub-bands including a sub-band that includes high-frequency components and a sub-band that does not include high-frequency components; and an encoding unit configured to encode the plurality of second images and the base image, and wherein, as for the plurality of second images, the encoding unit encodes the sub-band that includes high-frequency components, and, as for the base image, the encoding unit encodes the sub-band that does not include high-frequency components.

According to another aspect of the present invention, there is provided an image processing method to be performed by an image processing apparatus, the method comprising: dividing a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components; and encoding the plurality of second images and the base image, wherein, during the encoding, as for the plurality of second images, the sub-band that includes high-frequency components is encoded, and, as for the base image, the sub-band that does not include high-frequency components is encoded.

According to a further aspect of the present invention, there is provided an image processing method to be performed by an image processing apparatus, the method comprising: converting, to a luminance component and a color difference component, a base image corresponding to a plurality of first images captured from different viewpoints, and a plurality of second images each corresponding to one or more of the plurality of first images; dividing the luminance component and the color difference component into a plurality of sub-bands including a sub-band that includes high-frequency components and a sub-band that does not include high-frequency components; and encoding the plurality of second images and the base image, wherein, during the encoding, as for the base image, the plurality of sub-bands of the color difference component are encoded, and the sub-band that does not include high-frequency components of the luminance component is encoded, and as for the plurality of second images, the color difference component is not encoded, and the sub-band that includes high-frequency components of the luminance component is encoded.

According to another aspect of the present invention, there is provided an image processing method to be performed by an image processing apparatus, the method comprising: acquiring encoded data of a sub-band that does not include high-frequency components of a base image corresponding to a plurality of first images captured from different viewpoints, and encoded data of a sub-band that includes high-frequency components of a plurality of second images each corresponding to one or more of the plurality of first images; generating a refocused image using the plurality of first images that have been restored using the encoded data of the plurality of second images; and adding the refocused image to the base image obtained by decoding the encoded data of the base image.

According to a further aspect of the present invention, there is provided a non-transitory computer-readable medium storing a command that can be executed by a computer, wherein the command, upon being executed by the computer, causes the computer to function as an image processing apparatus comprising: dividing unit for dividing a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components; and encoding unit for encoding the plurality of second images and the base image, wherein, as for the plurality of second images, the encoding unit encodes the sub-band that includes high-frequency components, and, as for the base image, the encoding unit encodes the sub-band that does not include high-frequency components.

According to another aspect of the present invention, there is provided a non-transitory computer-readable medium storing a command that can be executed by a computer, wherein the command, upon being executed by the computer, causes the computer to function as an image processing apparatus comprising: converting unit for converting, to a luminance component and a color difference component, a base image corresponding to a plurality of first images captured from different viewpoints, and a plurality of second images each corresponding to one or more of the plurality of first images; dividing unit for dividing the luminance component and the color difference component into a plurality of sub-bands including a sub-band that includes high-frequency components and a sub-band that does not include high-frequency components; and encoding unit for encoding the plurality of second images and the base image, wherein, as for the base image, the encoding unit encodes the plurality of sub-bands of the color difference component, and encodes the sub-band that does not include high-frequency components of the luminance component, and as for the plurality of second images, the encoding unit does not encode the color difference component, and encodes the sub-band that includes high-frequency components of the luminance component.

According to a further aspect of the present invention, there is provided a non-transitory computer-readable medium storing a command that can be executed by a computer, wherein the command, upon being executed by the computer, causes the computer to function as an image processing apparatus comprising: acquiring unit for acquiring encoded data of a sub-band that does not include high-frequency components of a base image corresponding to a plurality of first images captured from different viewpoints, and encoded data of a sub-band that includes high-frequency components of a plurality of second images each corresponding to one or more of the plurality of first images; generating unit for generating a refocused image using the plurality of first images that have been restored using the encoded data of the plurality of second images; and adding unit for adding the refocused image to the base image obtained by decoding the encoded data of the base image.

Further features of the present invention will become apparent from the following description of exemplary embodiments with reference to the attached drawings.

BRIEF DESCRIPTION OF THE DRAWINGS

FIG. 4 relates to sub-band division performed by the image compression unit according to the embodiment.

FIGS. 6A and 6B relate to a functional configuration of an image processing unit according to the embodiment.

FIGS. 11A and 11B relate to the details of FIG. 10.

FIGS. 17A to 17C relate to a functional configuration of the image compression unit of the digital camera according to a third embodiment.

FIGS. 18A and 18B are flowcharts relating to an image capture operation and a refocusing operation according to the third embodiment.

FIGS. 19A to 19C relate to a functional configuration of the image processing unit according to the third embodiment.

FIGS. 21A and 21B relate to a functional configuration of the image capture unit and the image compression unit of the digital camera according to a fourth embodiment.

FIGS. 24A to 24C relate to a functional configuration and operations of the image capture unit of the digital camera according to the fifth embodiment.

FIG. 27 relates to a functional configuration of the image processing unit of the digital camera according to the sixth embodiment.

DESCRIPTION OF THE EMBODIMENTS

Exemplary embodiments of the present invention will now be described in detail in accordance with the accompanying drawings. Note that the present invention is not limited to the embodiments described below. Also, not all of the constituent elements described in the embodiments are necessarily essential for the present invention. Each functional block in the embodiments can be realized with hardware, such as a programmable logic device or a circuit component, or software that can be executed by a programmable processor, or a combination of such hardware and software. One functional block may be realized with a plurality of pieces of hardware. Also, one piece of hardware may realize a plurality of functional blocks. One or more functional blocks may be realized by one or more programmable processors (CPUs, MPUs etc.) executing a computer program that is loaded to a memory.

Hereinafter, embodiments in which the present invention is applied to a digital camera, which serves as an example of an image processing apparatus, will be described. However, the present invention is applicable to any electronic device capable of handling multi-viewpoint images. Such electronic devices include image capture apparatuses, information processing apparatuses such as a computer, a smartphone, a tablet terminal, or a game machine, appliances, robots, and the like, but are not limited thereto.

First Embodiment

Figure 1:
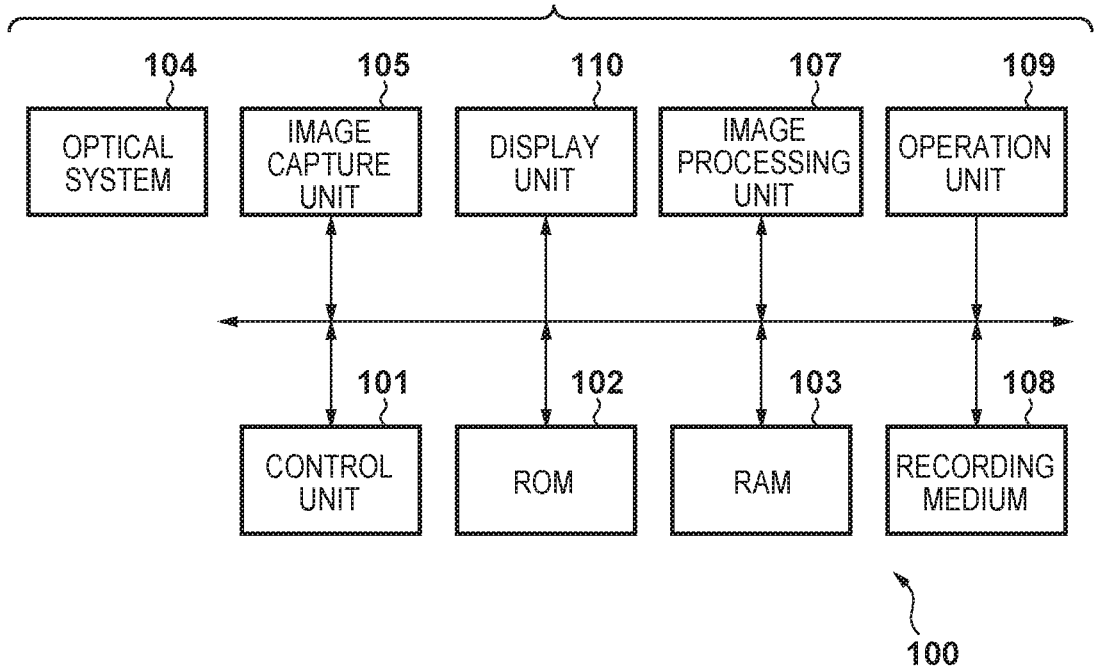
FIG. 1 is a block diagram illustrating a functional configuration of a digital camera, which serves as an example of an image processing apparatus according to an embodiment.

FIG. 1 is a block diagram illustrating a functional configuration example of a digital camera 100 according to this embodiment. A control unit 101 is constituted by one or more programmable processors (CPUs, MPUs), for example. The control unit 101 controls operations of functional blocks of the digital camera 100 by loading a program stored in a ROM 102 to a RAM 103 and executing it, for example, and realizes functions of the digital camera 100.

The ROM 102 is a rewritable, nonvolatile memory, and stores not only programs that can be executed by the control unit 101, but also various set values, GUI data, and so on.

The RAM 103 is a rewritable, volatile memory, and is used as a system memory to execute programs, or as a temporary data storage area (buffer memory).

An optical system 104 includes a plurality of lenses, a diaphragm, and so on, and forms an optical image of a subject on an imaging plane of an image capture unit 105. The optical system 104 may be or may not be removable. The optical system 104 includes movable lenses, such as a focusing lens, a zoom lens, and a shake correction lens, as well as a mechanism for driving the movable lenses.

The image capture unit 105 includes a pixel unit and peripheral circuits (e.g. readout circuit, A/D converter, encoding circuit etc.). As will be described later, the image capture unit 105 according to this embodiment performs two-dimensional sub-band encoding on image data, and primarily stores the results in the RAM 103.

An image processing unit 107 decodes encoded data stored in the RAM 103, and applies various kinds of image processing, such as white balance adjustment, color interpolation, reduction/enlargement, and filtering, to the image data obtained as a result of the decoding. The image processing unit 107 is implemented by an ASIC in general, but processing thereof may be partially realized by the control unit 101 executing a program. The image processing unit 107 again stores the image data that has been subjected to processing, in the RAM 103. Note that the image processing unit 107 may also perform processing to acquire, from image data, information to be used in automatic focus detection (AF) and automatic exposure control (AE).

The control unit 101 generates an image file using the encoded data output by the image capture unit 105 or the image data that has been processed by the image processing unit 107, and records the generated image file to a recording medium 108. Processing that the image processing unit 107 applies to image data and the configuration of the image file generated by the control unit 101 are predetermined in accordance with a recording format. The recording medium 108 is a removable memory card, for example.

An operation unit 109 is a generic name of input devices for a user to give instructions to the digital camera 100. A shutter button, a moving image capture/pause button, a power button, a menu button, a direction key, a set button, and so on, are included in the operation unit 109. The control unit 101 monitors operations made to the operation unit 109, and performs an operation in accordance with a detected operation.

A display unit 110 is an LCD or an OLED, for example, and displays various kinds of information regarding the digital camera 100, captured images, and GUIs (menu screen etc.). The display unit 110 may also be a touch panel display, and in this case, the touch panel is included in the operation unit 109.

Figure 2A:
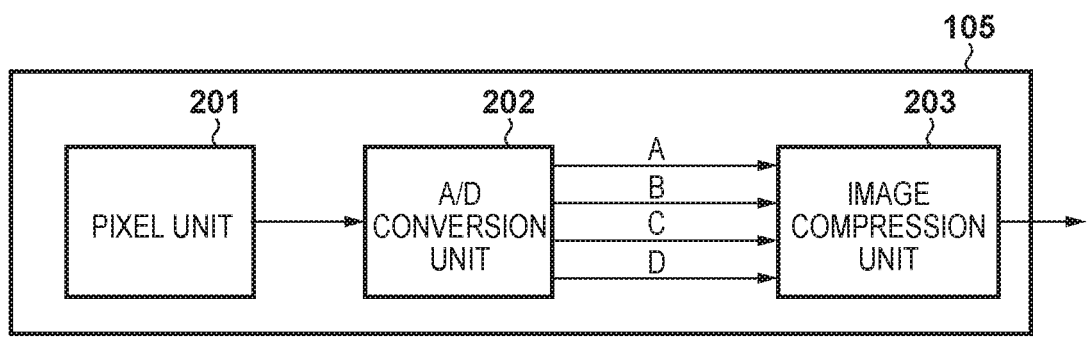
FIGS. 2A to 2C relate to an image capture unit of the digital camera according to the embodiment.
Figure 2B:
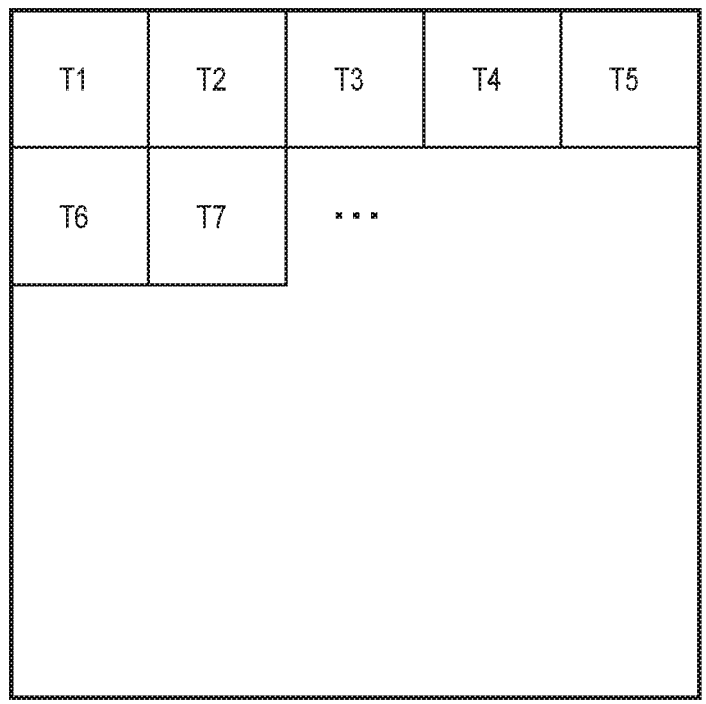

FIG. 2A is a block diagram illustrating a functional configuration example of the image capture unit 105. A pixel unit 201 converts an optical image to an analog image signal, and outputs it to the A/D conversion unit 202. The A/D conversion unit 202 performs A/D conversion on the analog image signal, and outputs it as image data to an image compression unit 203. To reduce the size of a line buffer in the image compression unit 203, the image data is output in units of tiles (T1, T2, T3, . . . ), such as those shown in FIG. 2B. The image compression unit 203 performs two-dimensional sub-band division on an image, and encodes components in a specific band.

In this embodiment, the image capture unit 105 is constituted by one chip in which the pixel unit 201, which is formed in a first layer (first semiconductor substrate), and the image compression unit 203, which is formed in a second layer (second semiconductor substrate), are stacked together, and are electrically connected to each other by at least one through-hole via. The image compression unit 203 is thus embedded in the chip in this embodiment for the purpose of power-saving, high-speed processing, and low-cost design. If the pixel unit 201 is arranged on a substrate within the chip, and the image compression unit 203 is arranged on a substrate outside the chip, there will be more resistance components and capacitance components in the wiring. As a result, the speed of communication therebetween is lower than that in communication using an interconnect within the same chip. To achieve high-speed communication, those units need to be driven by an amplifier to keep signal waveform quality, and driving power needs to be increased. In contrast, by arranging both the pixel unit 201 and the image compression unit 203 on the semiconductor substrates within the same chip, an output interconnect can be made short, and the amplifier can also be omitted. In addition, since the amount of encoded data output from the image capture unit 105 is small, the time taken for communication between the image capture unit 105, the control unit 101, and the image processing unit 107 is shortened, making it possible to increase the processing speed, reduce the processing load, and also reduce power consumption.

Figure 2C:
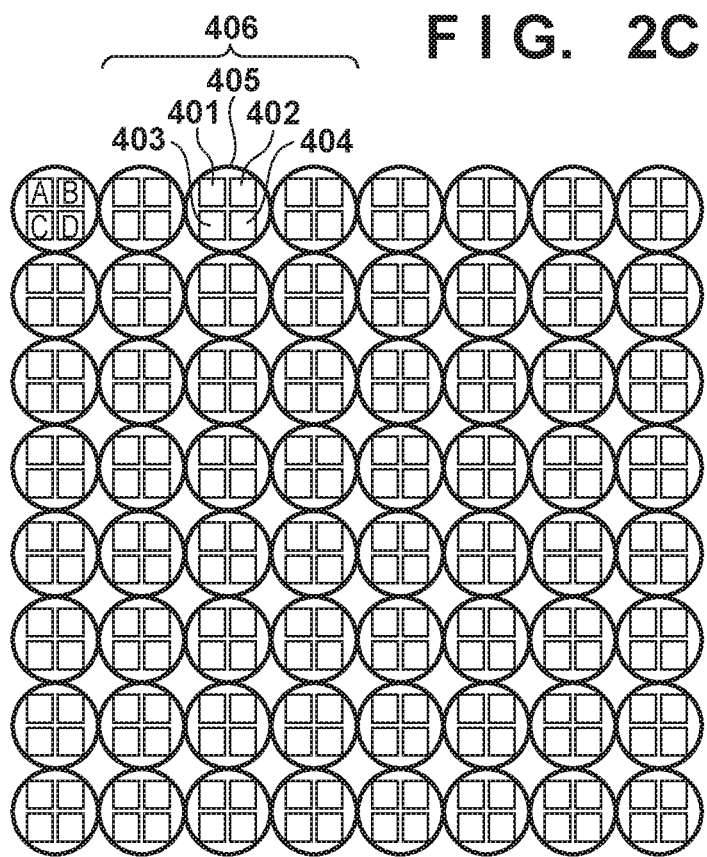

FIG. 2C is a schematic diagram illustrating an example of a pixel configuration and arrangement of the pixel unit 201. In the pixel unit 201, a plurality of pixels 406 are two-dimensionally arranged in the horizontal and vertical directions. Each of the pixels 406 includes one microlens 405 and four photoelectric conversion units 401, 402, 403, and 404. The four photoelectric conversion units 401 to 404, which share the one microlens 405, receive light beams that have passed through different partial pupil areas of the exit pupil of the optical system 104. Accordingly, four parallax images (first images) can be obtained as a result of performing exposure or capturing an image once, by independently obtaining analog image signals from a photoelectric conversion unit 401 group, a photoelectric conversion unit 402 group, a photoelectric conversion unit 403 group, and a photoelectric conversion unit 404 group, in the plurality of pixels 406. The four parallax images, which are a plurality of images captured from different viewpoints, can also be called multi-viewpoint images.

In this embodiment, out of the parallax images that constitute multi-viewpoint images, an image obtained by the photoelectric conversion unit 401 group is called an image A. An image obtained by the photoelectric conversion unit 402 group is called an image B. An image obtained by the photoelectric conversion unit 403 group is called an image C. An image obtained by the photoelectric conversion unit 404 group is called an image D.

Figure 3:
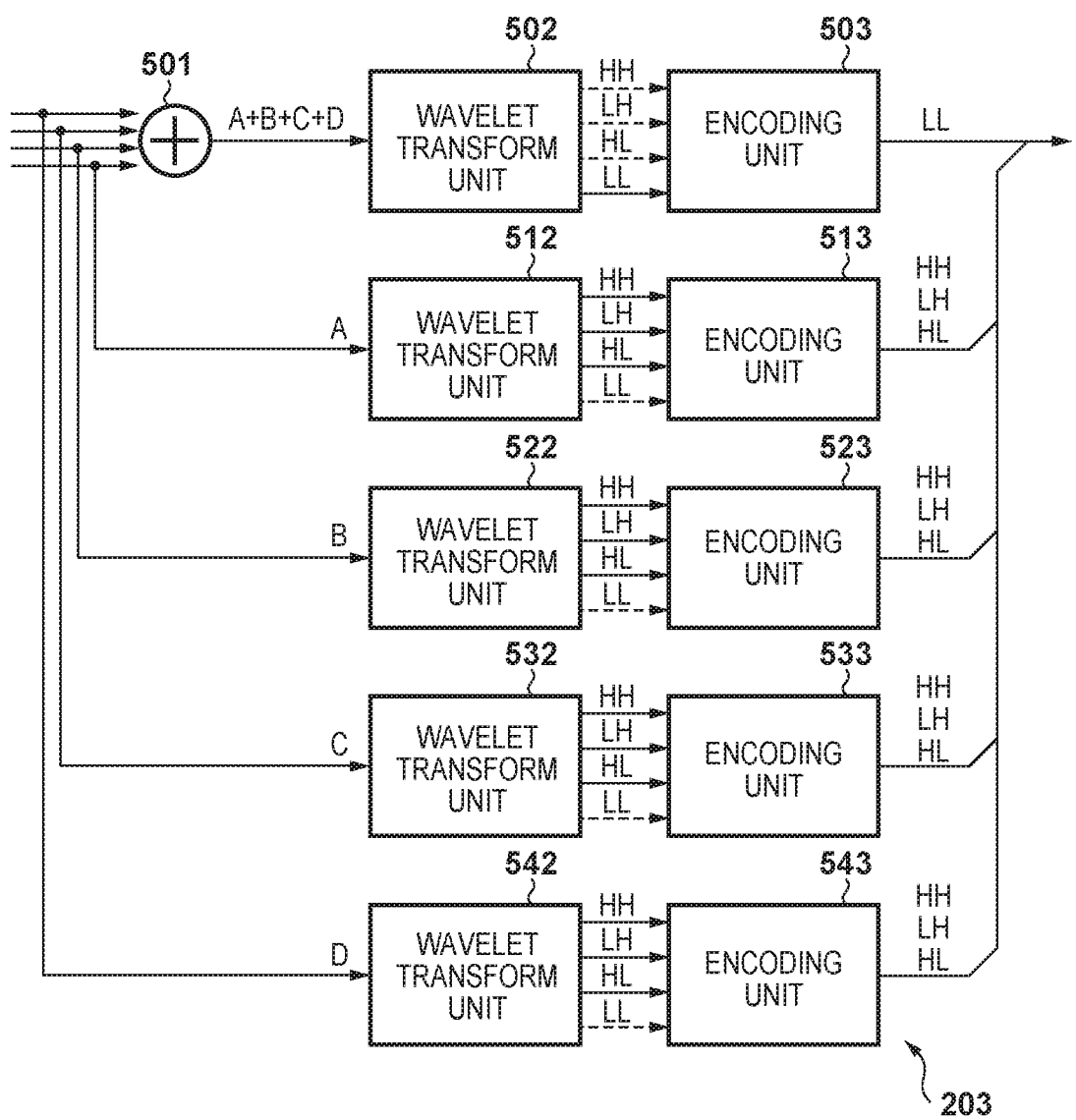
FIG. 3 relates to a functional configuration of an image compression unit in the image capture unit according to the embodiment.

FIG. 3 is a block diagram illustrating a functional configuration example of the image compression unit 203 in FIG. 2A. An adder unit 501 adds the images A to D with the shift amount being 0, and averages respective pixel values (i.e. divides respective pixel values by four), thereby generating a base image (A+B+C+D) that includes a light beam passing through the center of the exit pupil of the optical system 104. Although the base image here is an average image of the multi-viewpoint images, the base image may not be the average image. For example, a base image may be generated by simply adding pixel values, and the generated base image may be corrected so that the range of the pixel values of a plurality of parallax images that constitute the multi-viewpoint images matches the range of the pixel values of the base image. In this specification, an image A+B refers to an image based on addition of the image A and the image B, or an image that is equal thereto. That is to say, the image A+B may be an image based on addition of a signal group obtained from the photoelectric conversion units 401 and a signal group obtained from the photoelectric conversion units 402, or may be a signal group obtained from photoelectric conversion units, each of which is equal to a combination of the photoelectric conversion unit 401 and the photoelectric conversion unit 402. Wavelet transform units 502, 512, 522, 532, and 542 apply two-dimensional wavelet transform (hereinafter, simply "wavelet transform"), which serves as an example of two-dimensional sub-band division, to the base image and the images A to D, respectively. Note that, in this embodiment, the wavelet transform unit $5n2$ ($n=0$ to 4) applies wavelet transform at decomposition level of up to 1.

In this embodiment, an image obtained based on addition of all of the parallax images (images A to D) that constitute multi-viewpoint images is used as the base image. However, an image obtained based on addition of some of the images A to D may alternatively be used as a base image. Refocusing, which will be described later, is performed based on a viewpoint position of the base image. For example, if A+B+C is used as the base image, a refocused image may be generated using the images A. B, and C, based on the viewpoint of A+B+C serving as a reference. Furthermore, if, for example, an image E from the same viewpoint as those of A+B is obtained from a separately-provided photoelectric conversion element group, the image E may be used as the base image, and the images A and B with which the image E can be generated may be used as parallax images.

That is to say, in the present invention, the base image need only be an image that corresponds to two or more of a plurality of parallax images, i.e. an image that can be generated based on two or more parallax images. Also, parallax images (second images) that are to be encoded may also be images that correspond to two or more of the first images, as long as a plurality of parallax images (first images) can be ultimately obtained with which the base image can be generated. For example, if an image that corresponds to A+B+C is used as the base image, any of the combinations (1) A, B, and C, (2) A+B and A, (3) A+C and A, (4) B+C and C, (5) A−B and C, and so on, can be used as parallax images and encoded. Note that a parallax image that does not constitute the base image (D in the above example) may be or may not be encoded. Thus, in the present invention, there are a case (1) where a plurality of parallax images (first images) with which the base image can be generated are encoded as-is, and cases (2) to (5) where a plurality of images that correspond to one or more of the first images are encoded. For this reason, parallax images that are to be encoded are called second images. However, this embodiment will describe the case where the second images are equal to the first images.

FIG. 4 schematically shows arrangements of a plurality of sub-band signals that are obtained by wavelet transform at decomposition levels 0 to 3. The decomposition level 0, which is denoted by 701, corresponds to an original image. 702 to 704 denote arrangements of sub-bands after wavelet transform at decomposition levels 1 to 3, respectively. "n" in sub-bands nLL, nHL, nLH, and nHH indicates the decomposition level (1 to 3), and LL, HL, LH, and HH indicate types of band-pass filtering (high-pass filtering or low-pass filtering) that is applied in the horizontal and vertical directions. Of wavelet coefficients, the coefficient of the sub-band nLL that does not include high-frequency components is called a scaling coefficient, and the coefficients of the remaining three sub-bands nHL, nLH, and nHH that include high-frequency components are called wavelet expansion coefficients.

Encoding units 503, 513, 523, 533, and 543 apply encoding, such as quantization and arithmetic encoding, to the coefficients of the sub-bands that have been divided by wavelet transform. The encoding method performed by the encoding unit 5$n$3 (n=0 to 4) is not particularly limited, and may be lossless or lossy encoding.

Figure 5A:
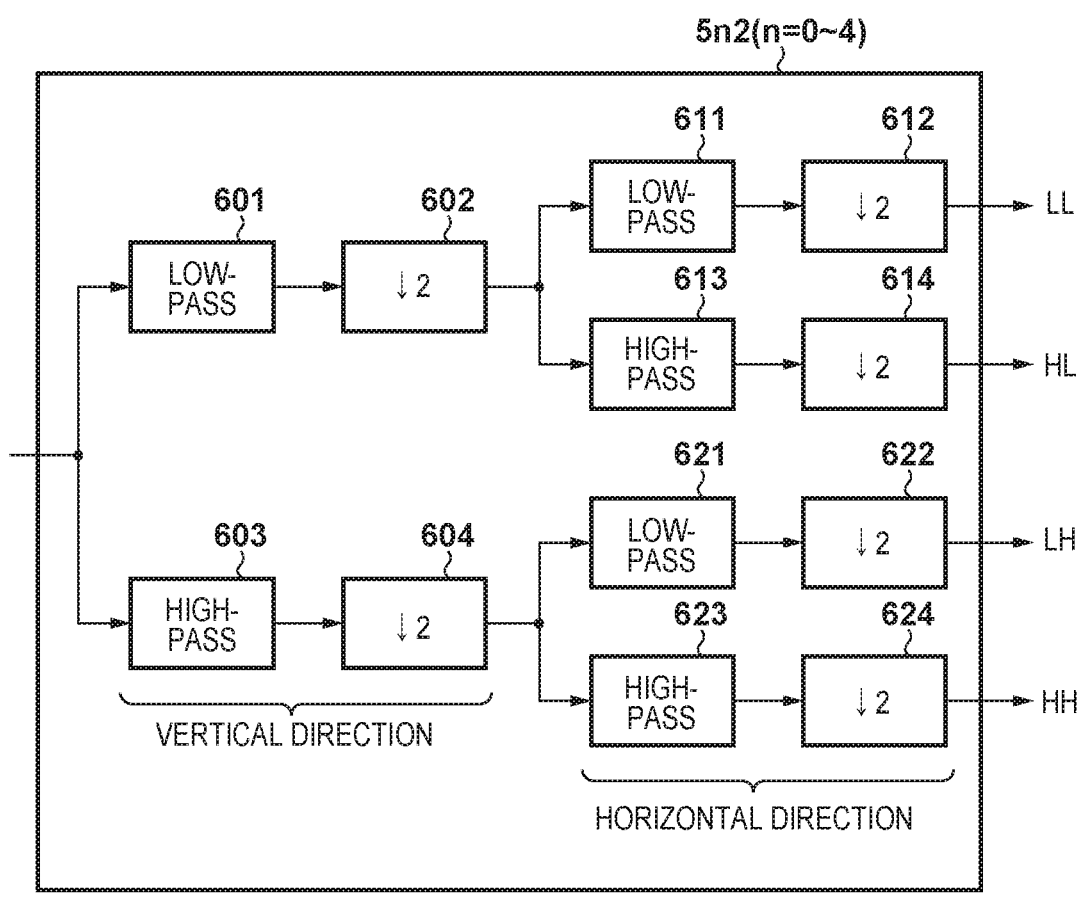
FIGS. 5A and 5B relate to a wavelet transform unit included in the image compression unit according to the embodiment.

FIG. 5A is a block diagram illustrating a functional configuration example of the wavelet transform unit 5$n$2 (n=0 to 4). In this embodiment, as an example, wavelet transform using orthonormal wavelets, which are expressed by Expressions 1 and 2 below, is performed.

$$H0(z)=b0+\Sigma bn \cdot (z^n+z^-n) \quad \text{(Expression 1)}$$

$$H1(z)=c0+\Sigma cn \cdot (z^n+z^-n) \quad \text{(Expression 2)}$$

Here, n is an integer that is any of 0 to 3, and the values of coefficients bn and cn are as follows.

b0=0.602949
b1=0.266864
b2=−0.078223
b3=−0.016864
b4=0.026748
c0=1.115087
c1=−0.591271
c2=−0.057543
c3=0.091271

Figure 5B:
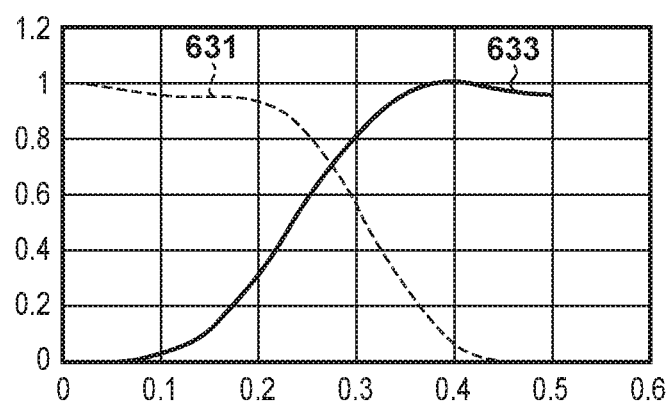

The coefficient bn is a sequence that expresses the scaling function of the wavelet, and the coefficient cn is a sequence that expresses the wavelet. FIG. 5B illustrates amplitude-frequency characteristics 631 of the transfer function H0($z$), and amplitude-frequency characteristics 633 of the transfer function H1($z$). The vertical axis and the horizontal axis of the amplitude-frequency characteristics indicate, respectively, the amplitude and the normalized frequency that is normalized by sampling frequency, and the Nyquist frequency corresponds to 0.5.

The low-pass filter unit 601 has the transfer function H0($z$), and generates a scaling coefficient in the vertical direction. A high-pass filter unit 603 has the transfer function H1($z$), and generates a wavelet expansion coefficient in the vertical direction. Downsampling units 602 and 604 halve the number of pixels through downsampling in the vertical direction.

Low-pass filter units 611 and 621 have the transfer function H0($z$), and generate scaling coefficients in the horizontal direction. High-pass filter units 613 and 623 have the transfer function H1($z$), and generate wavelet expansion coefficients in the horizontal direction. Downsampling units 612, 622, 614, and 624 halve the number of pixels through downsampling in the horizontal direction.

The encoding unit 503, which corresponds to the base image, only outputs encoded data of the scaling coefficient (1LL). The encoding units 513, 523, 533, and 543, which correspond to four parallax images (images A to D), only output encoded data of the wavelet expansion coefficients (1LH, 1HL, and 1HH). This can also be realized by outputting only coefficients that are to be encoded, from the wavelet transform units to the respective encoding units, or by ignoring coefficients other than those that are to be encoded by the encoding units.

Since all of the wavelet coefficients LL, HL, LH, and HH are downsampled to be halved in both the horizontal and vertical directions when generated, the number of coefficients after having been encoded is one-fourth of that before being encoded. Accordingly, if the number of pixels of the original image is 1, the number of encoded data is ¼+¾× 4=(3+¼), and the amount of encoded data can thus be reduced compared with the case of independently encoding each of the images A to D (1×4=4).

Since the amount of encoded data output from the image capture unit 105 is reduced, it is possible to suppress a decrease in the frame rate for moving images and the number of still images that can be continuously captured, even in the case of handling multi-viewpoint images. Also, the number of still images that can be continuously captured can be increased without changing the buffer capacity to be secured in the RAM 103.

The control unit 101 records the encoded data of the base image and the four parallax images (images A to D) that are output by the image capture unit 105, to the recording medium 108. Note that, when recording the encoded data into the recording medium 108, the control unit 101 includes, in a header or the like of a data file, information regarding the decomposition level of wavelet transform and sub-bands recorded for the base image and the parallax images. The encoded data that is read out from the recording medium 108 can be loaded to the RAM 103, and can be decoded and subjected to refocusing by the image processing unit 107.

Figure 6A:
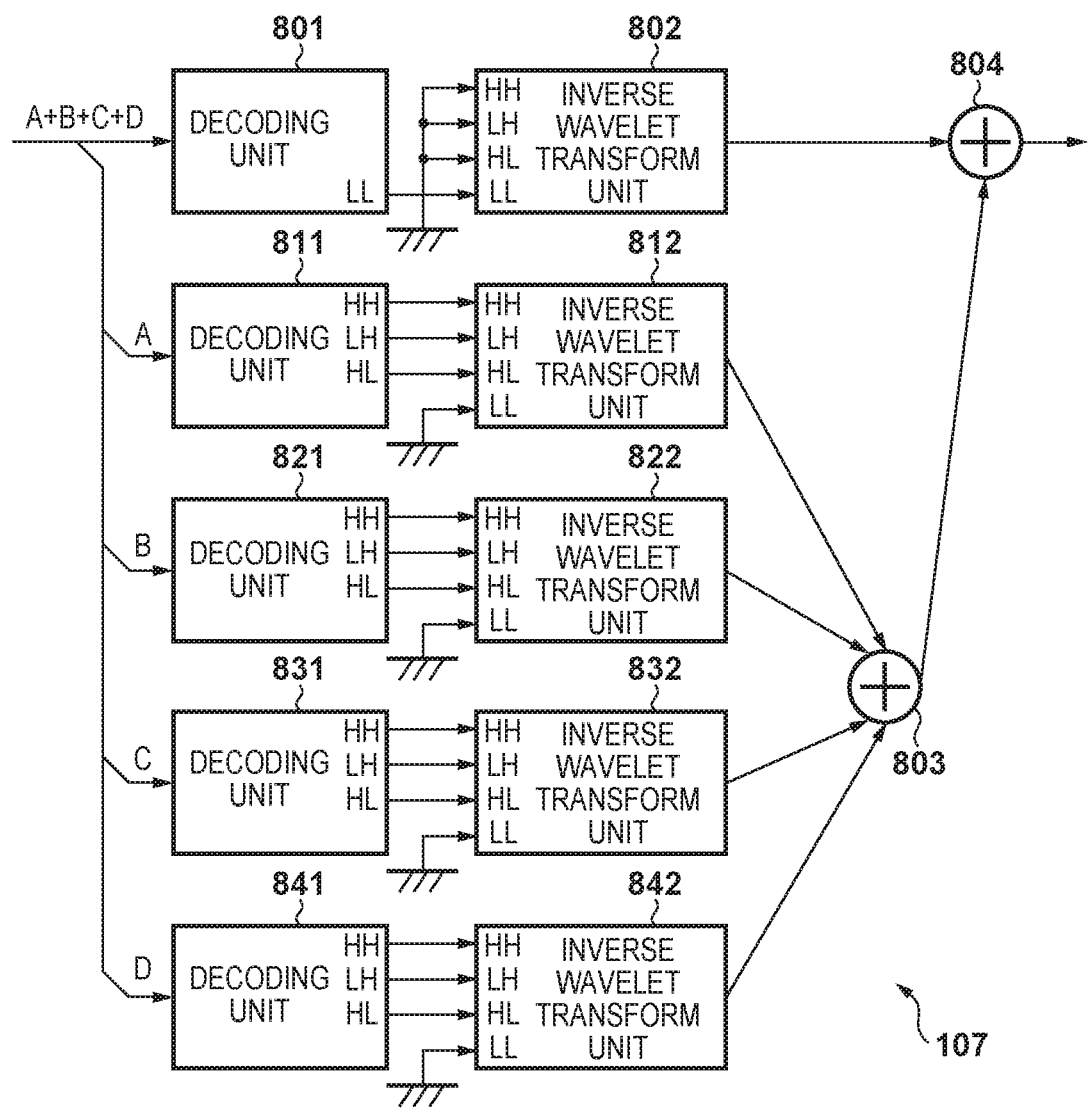

FIG. 6A illustrates, as functional blocks, operations of the image processing unit 107 when decoding the encoded data. The decoding and refocusing described here are merely some of various kinds of image processing that the image processing unit 107 can perform. Processing to extract encoded data from a data file and distribute the encoded data to decoding units is also performed within the image processing unit 107. Decoding units 801, 811, 821, 831, and 841 decode the scaling coefficient (1LL) and the wavelet expansion coefficients (1LH, 1HL, and 1HH) at decomposition level 1. Note that the decoding units may decode all of the coefficients and supply only specific coefficients to inverse wavelet transform units, or may decode only the coefficients to be supplied to the inverse wavelet transform units. The decoding unit 801 decodes 1LL of the base image, and the decoding units 811, 821, 831, and 841 decode 1LH, 1HL, and 1HH of the images A to D, respectively. The decoding unit 8n4 (n=0 to 4) performs decoding corresponding to the encoding method.

Inverse wavelet transform units 802, 812, 822, 832, and 842 restore the images that have been divided into sub-bands, by performing two-dimensional inverse wavelet transform on the respective decoded sub-bands (sub-band restoration). Only the scaling coefficient (1LL) is recorded in the encoded data of the base image. For this reason, the inverse wavelet transform unit 802 performs inverse wavelet transform with the wavelet expansion coefficients (1LH, 1HL, and 1HH) being 0. Meanwhile, the scaling coefficient (1LL) is not recorded in the encoded data of the images A to D. For this reason, the inverse wavelet transform units 812, 822, 832, and 842 perform inverse wavelet transform with the scaling coefficient (1LL) being 0.

A shift-and-add operation unit 803 performs a shift-and-add operation for refocusing, on the images A to D that have been subjected to inverse wavelet transform. Refocusing by means of a shift-and-add operation is known, as described in Japanese Patent Laid-Open No. 2015-171097, for example. The control unit 101 displays, for example, the base image on the display unit 110, and makes the user select the position to be brought into focus. For example, the control unit 101 determines the amount and direction of the shift-and-add operation so that the position in the image that has been designated through the operation unit 109 comes into focus, and notifies the shift-and-add operation unit 803 of the determined amount and direction. The shift-and-add operation unit 803 performs a shift-and-add operation on the images A to D in accordance with the shift direction and amount of which it has been notified, thereby generating a refocused image. The shift-and-add operation unit 803 outputs the image that has been subjected to refocusing, to an adder unit 804. The adder unit 804 adds the base image that has been subjected to inverse wavelet transform with only the scaling coefficient (1LL), and images obtained by performing refocusing on the images A to D that have been subjected to inverse wavelet transform with only the wavelet expansion coefficients (1LH, 1HL, and 1HH). A refocused base image is obtained by the adder unit 804.

FIG. 6B is a block diagram illustrating a functional configuration example of the inverse wavelet transform unit 8n2 (n=0 to 4) in FIG. 6A.

Upsampling units 901, 903, 911, and 913 double the number of pixels through upsampling in the horizontal direction. Low-pass filter units 902 and 912 apply low-pass filtering in the horizontal direction. High-pass filter units 904 and 914 apply high-pass filtering in the horizontal direction. Upsampling units 921 and 923 double the number of pixels through upsampling in the vertical direction. A low-pass filter unit 922 applies low-pass filtering in the vertical direction. A high-pass filter unit 924 applies high-pass filtering in the vertical direction. Adder units 905, 915, and 925 add intermediate images in the process of inverse wavelet transform.

The inverse wavelet transform units also perform inverse wavelet transform using orthonormal wavelets, which are expressed by Expressions 3 and 4 below.

$$G0(z)=d0+\Sigma dn \cdot (z^n+z^{-n})$$ (Expression 3)

$$G1(z)=e0+\Sigma en \cdot (z^n+z^{-n})$$ (Expression 4)

The values of the coefficients are as follows.
Here, n is an integer that is any of 0 to 3, and the values of coefficients bn and en are as follows.
d0=1.115087
d1=0.591271
d2=−0.057543
d3=−0.091271
e0=0.602949
e1=−0.266864
e2=−0.078223
e3=0.016864
e4=0.026748

The transfer function of the low-pass filter units is $G0(z)$, and the transfer function of the high-pass filter units is $G1(z)$.

In this embodiment, a refocused image is generated without performing a shift-and-add operation on low-frequency components (scaling coefficient (1LL)) of the images. However, in the case of refocusing with the shift amount being about 1 or 2 pixels, focus in low-frequency components hardly changes. For this reason, it is possible to achieve a focus adjustment effect that is equal to that of a conventional technique in which a shift-and-add operation is performed on all sub-band components.

Figure 7:
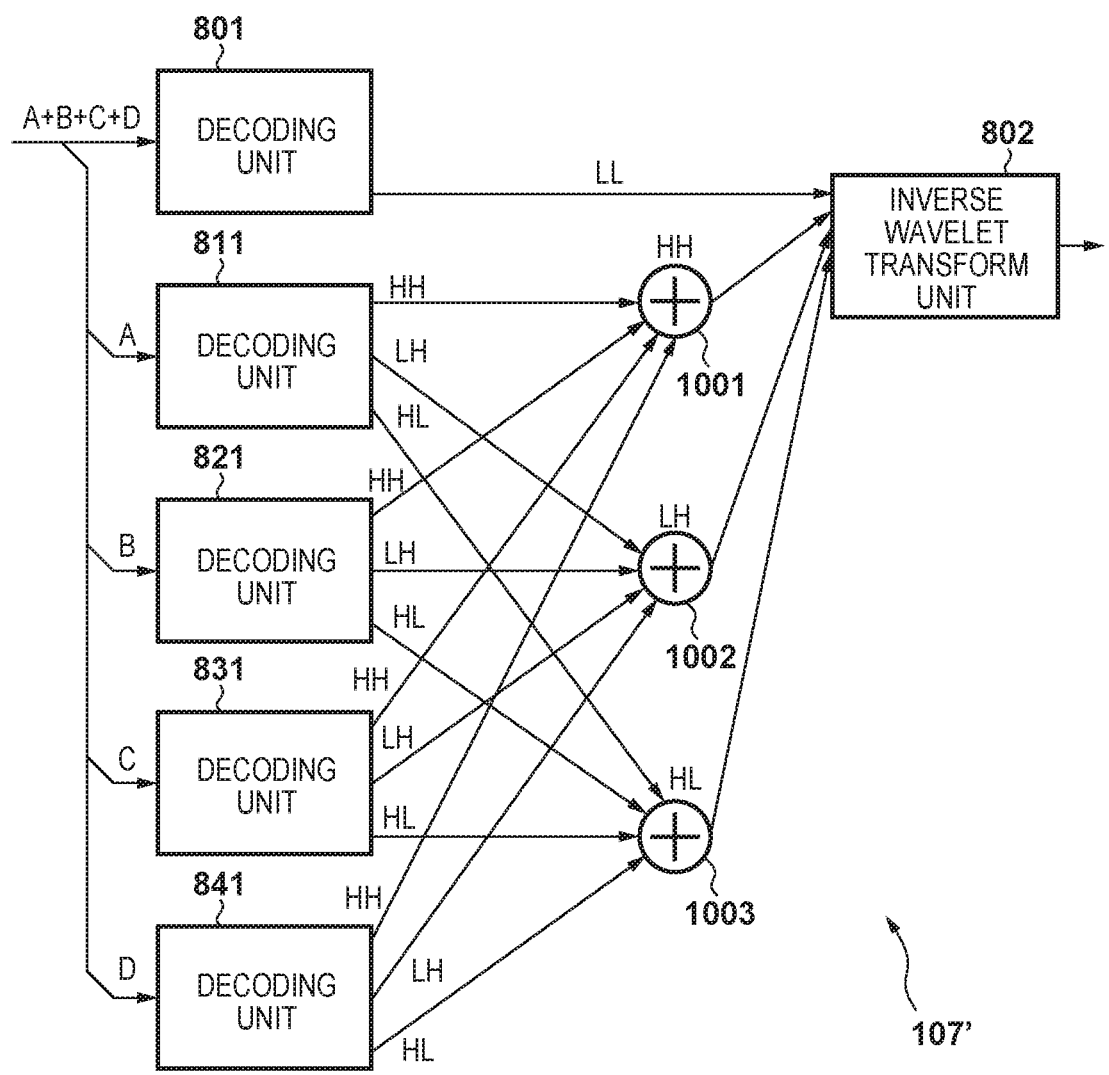
FIG. 7 relates to another functional configuration of the image processing unit according to the embodiment.

This embodiment has described a configuration in which a shift-and-add operation is performed on the images that have been subjected to inverse wavelet transform. However, a configuration may also be employed in which inverse wavelet transform is performed after performing a shift-and-add operation on each of the sub-band components. FIG. 7 illustrates a functional configuration example of an image processing unit 107' in this case. The same constituent elements as those in FIG. 6A are assigned the same reference numerals.

Shift-and-add operation units 1001, 1002, and 1003 perform a shift-and-add operation on HH, LH, and HL sub-band components, respectively, of the images A to D. Since the shift-and-add operation is performed on the sub-band components at decomposition level 1 whose number of pixels has been halved in the horizontal and vertical directions through downsampling, the shift amount is limited to units of 2n pixels. However, the number of times of inverse wavelet transform computation can be reduced, and accordingly, the computational costs can be reduced.

Also this embodiment has described a configuration in which the four parallax images (images A to D) do not include the base image (A+B+C+D) with the center of the exit pupil serving as a viewpoint. However, for example, one of the images A to D may be replaced with the image (A+B+C+D).

Figure 8:
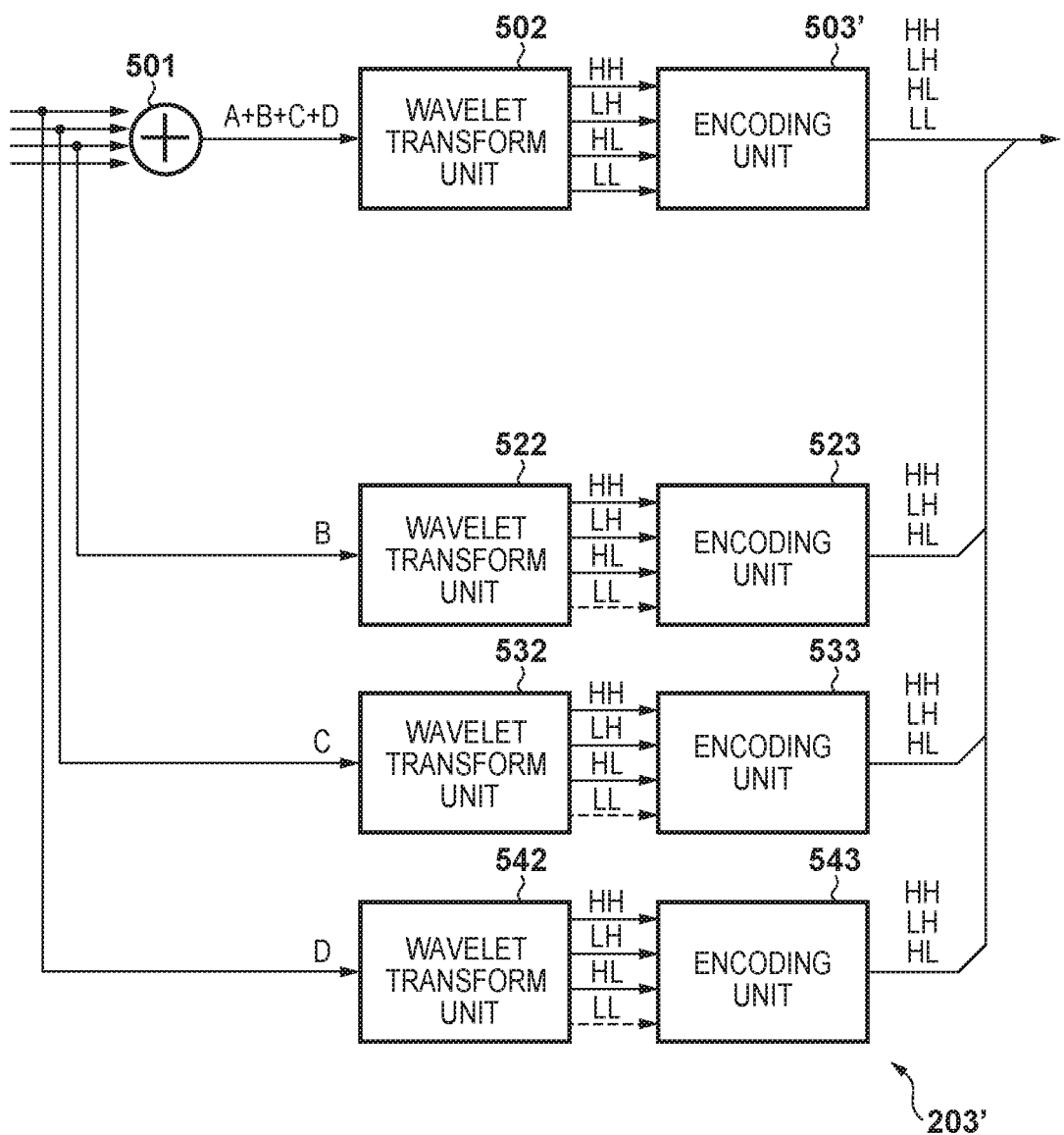
FIG. 8 relates to another functional configuration of the image compression unit according to the embodiment.

FIG. 8 is a block diagram illustrating a configuration example of an image compression unit 203' in the case of using the image (A+B+C+D) and the images B to D as four parallax images. The same constituent elements as those in FIG. 3 are assigned the same reference numerals.

In this case, the encoding unit 503', which corresponds to the image (A+B+C+D) that is used as the base image and also as one of the parallax images, encodes the scaling coefficient (1LL) and the wavelet expansion coefficients (1LH, 1HL, and 1HH) from the wavelet transform unit 502. Meanwhile, the encoding units 523, 533, and 543 that encode the images B to D, respectively, encode only the wavelet expansion coefficients (1LH, 1HL, and 1HH). In the configuration in FIG. 8 as well, the number of encoded data is $¼+¾×4=(3+¼)$, and the amount of encoded data can thus be reduced compared with the case of independently encoding the images A to D ($1×4=4$).

Figure 9:
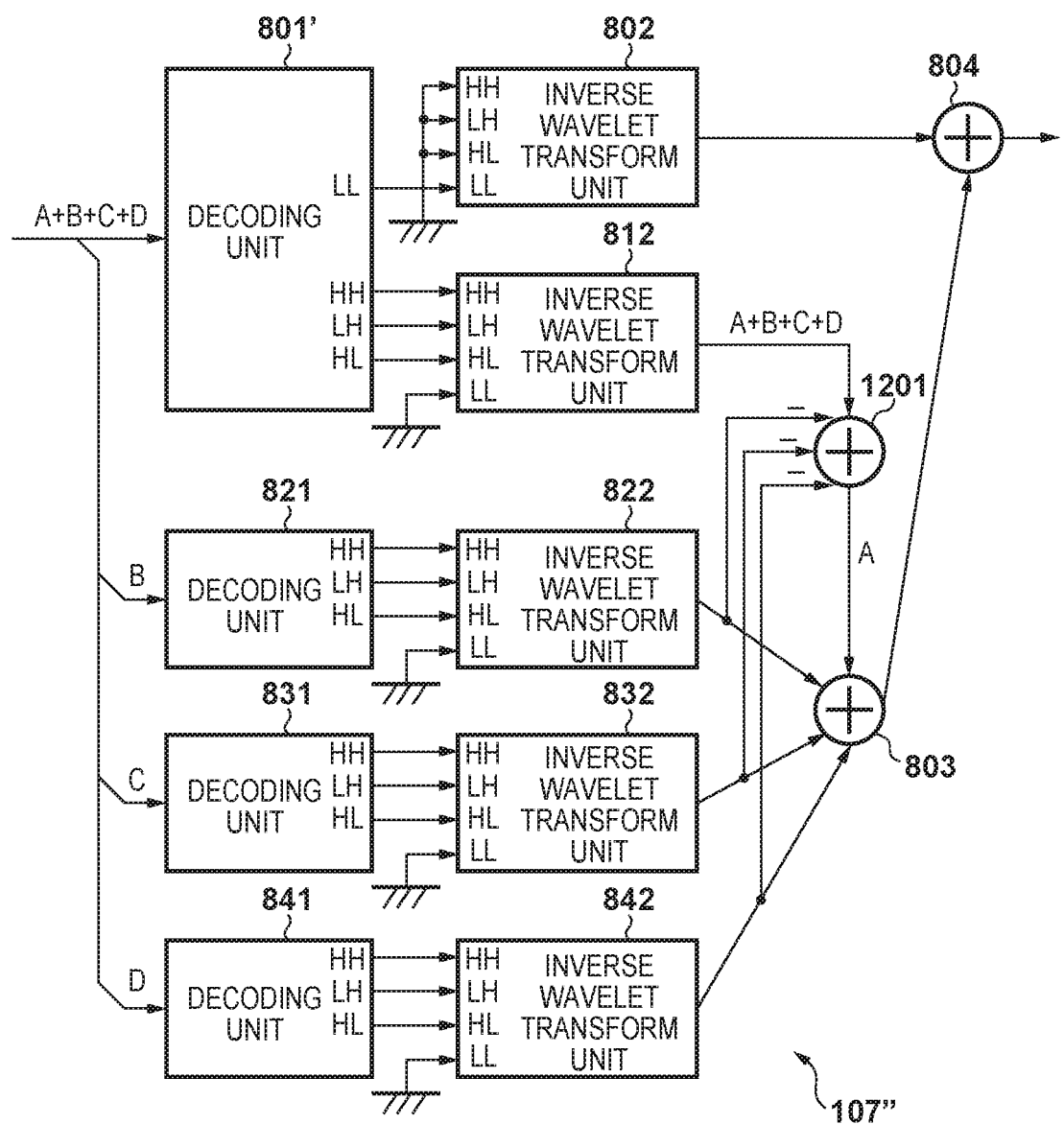
FIG. 9 relates to another functional configuration of the image processing unit according to the embodiment.

FIG. 9 is a block diagram illustrating a functional configuration example of an image processing unit 107″ for decoding the image data that has been encoded by the image compression unit 203′. The same constituent elements as those in FIG. 6A are assigned the same reference numerals.

A decoding unit 801 decodes the scaling coefficient (1LL) and the wavelet expansion coefficients (1LH, 1HL, and 1HH) at decomposition level 1 for the base image (A+B+C+D) that is also used as one of the parallax images.

The decoding units 821, 831, and 841 decode the wavelet expansion coefficients (1LH, 1HL, and 1HH) at decomposition level 1 for the images B to D, respectively.

The decoding unit 801′ performs the same processing as that of the decoding units 801 and 811 in FIG. 6A. That is to say, as for the base image, the decoding unit 801′ supplies the decoded scaling coefficient (1LL) as well as wavelet expansion coefficients (1LH, 1HL, and 1HH) that are 0, to the inverse wavelet transform unit 802. Also, the decoding unit 801′ outputs a scaling coefficient (1LL) of 0 and the decoded wavelet expansion coefficients (1LH, 1HL, and 1HH), to the inverse wavelet transform unit 812. The configuration of the inverse wavelet transform unit 812 is the same as that described with reference to FIG. 6B. The inverse wavelet transform unit 812 outputs an image obtained through inverse wavelet transform to a subtracter unit 1201.

Operations of the decoding units 821, 831, and 841 and the inverse wavelet transform units 802, 822, 832, and 842 are as described using FIGS. 6A and 6B.

The subtracter unit 1201 subtracts the output of the inverse wavelet transform units 822, 832, and 842 from the output of the inverse wavelet transform unit 812, generates an image that corresponds to the result of performing inverse wavelet transform on the image A, and outputs the generated image to the shift-and-add operation unit 803. Operations of the shift-and-add operation unit 803 and the adder unit 804 are as described using FIG. 6A.

Thus, the computational costs can also be reduced by using the base image (A+B+C+D) as one of the parallax images.

This embodiment has described a configuration in which the decomposition level of wavelet transform is 1, the scaling coefficient (LL) is recorded for the base image, and the wavelet expansion coefficients (HL, LH, and HH) are recorded for the parallax images. However, this embodiment is also applicable to the case of performing wavelet transform at decomposition levels 2 and 3, which are denoted by 703 and 704 in FIG. 4.

Figure 10:
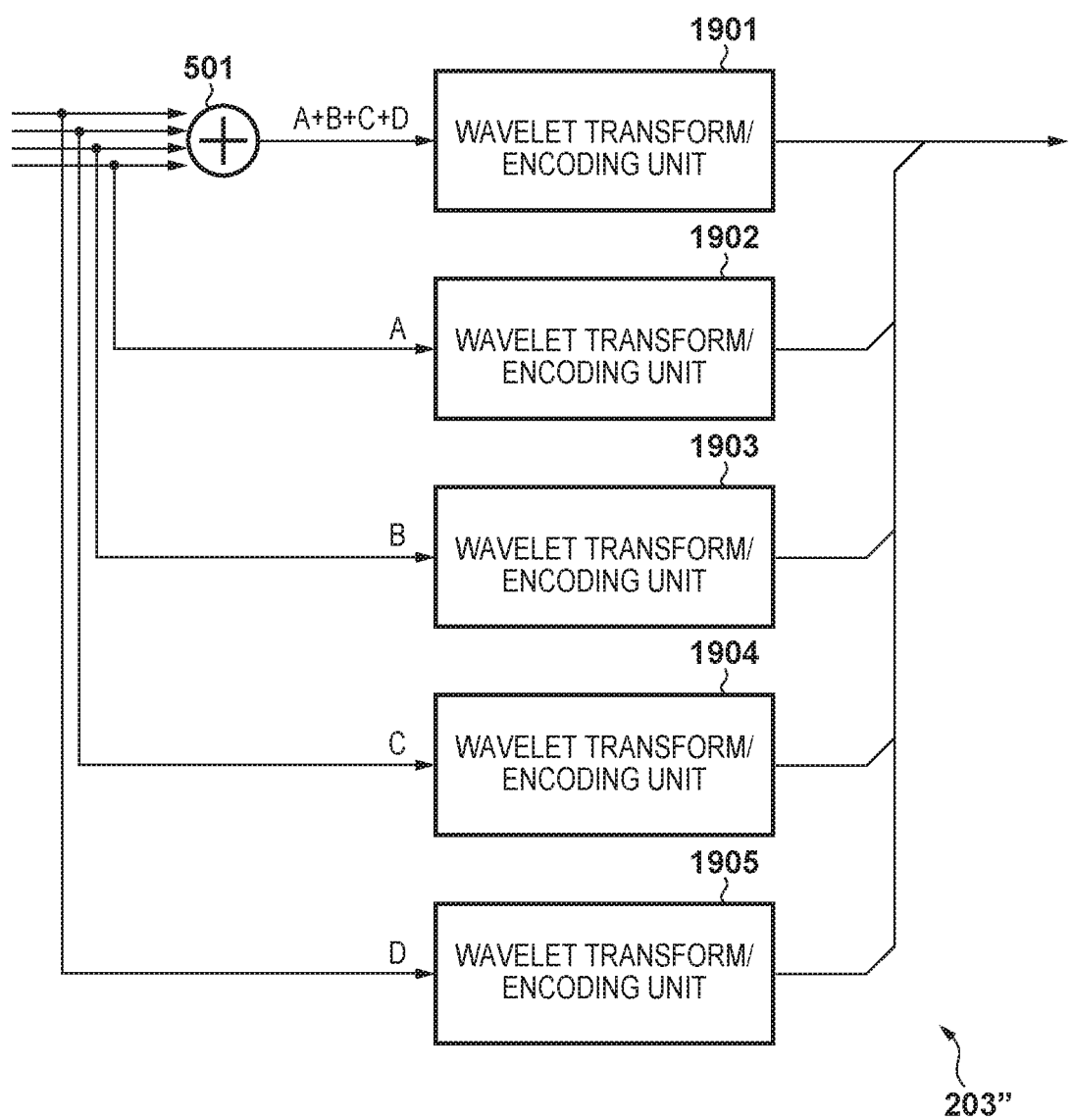
FIG. 10 relates to another functional configuration of the image compression unit according to the embodiment.

FIG. 10 is a block diagram illustrating a functional configuration example of an image compression unit 203″ in the case of performing wavelet transform at up to decomposition level 2. The adder unit 501 adds the images A to D to generate the base image (A+B+C+D) that includes a light beam passing through the pupil center of the optical system 104, and supplies the generated base image to a wavelet transform/encoding unit 1901. The images A to D are supplied to wavelet transform/encoding units 1902 to 1905, respectively.

FIG. 11A is a block diagram illustrating a functional configuration example of the wavelet transform/encoding unit 1901. Wavelet transform units 502 and 5021 perform wavelet transform at decomposition level 2 on the scaling coefficient (LL), and the encoding unit 503 outputs encoded data of the scaling coefficient (2LL) at decomposition level 2.

FIG. 11B is a block diagram illustrating a functional configuration example of the wavelet transform/encoding units 1902 to 1905. Wavelet transform units 512 and 5121 perform wavelet transform at decomposition levels 1 and 2 on the wavelet expansion coefficients (LH, HL, and HH). Encoding units 513 and 5131 output encoded data of the wavelet expansion coefficients (1LH, 1HL, and 1HH) at decomposition level 1, and encoded data of the wavelet expansion coefficients (2LH, 2HL, and 2HH) at decomposition level 2, respectively.

Figure 12:
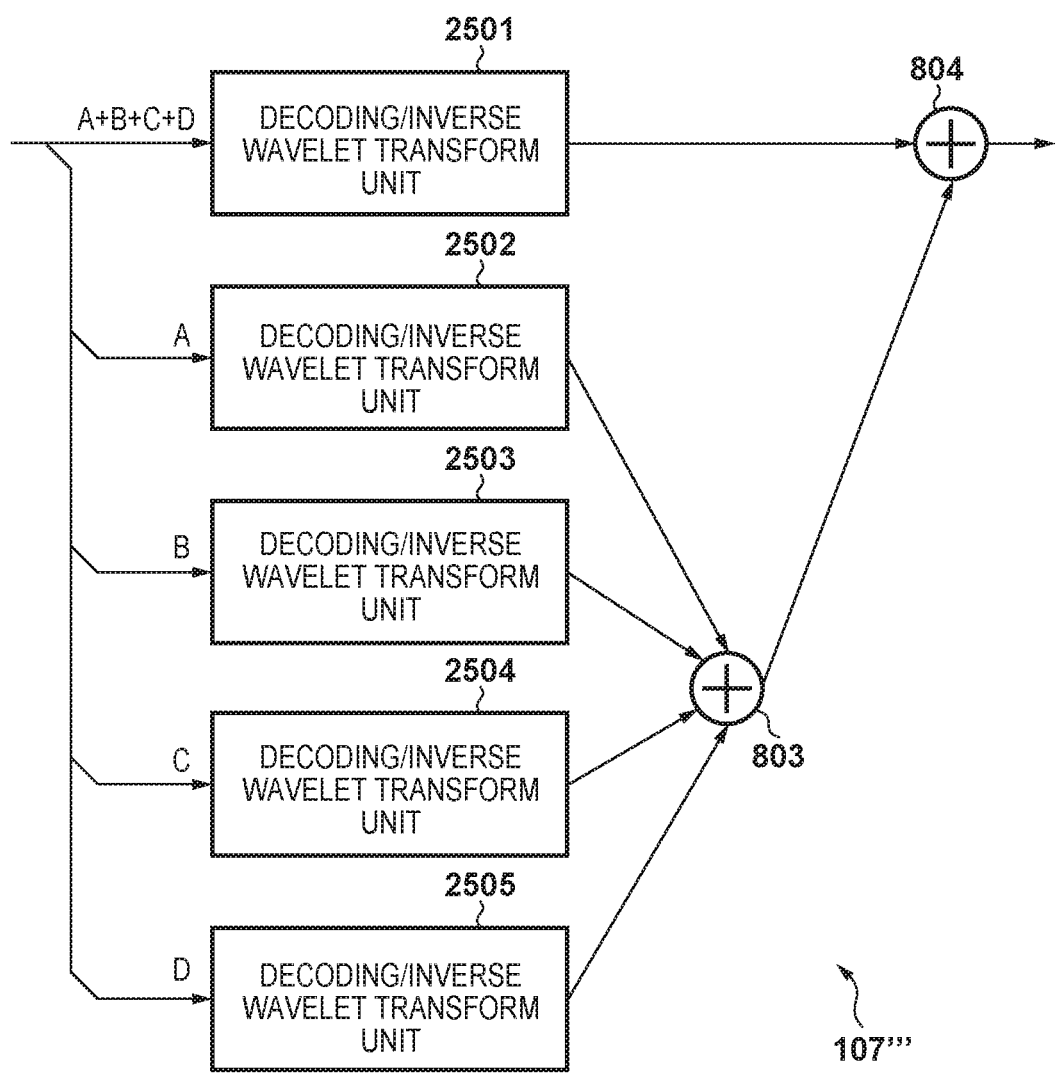
FIG. 12 relates to another functional configuration of the image processing unit according to the embodiment.

FIG. 12 is a block diagram illustrating a functional configuration example of an image processing unit 107′″ in the case of performing wavelet transform at up to decomposition level 2. The same functional blocks as those in FIG. 6A are assigned the same reference numerals. The image processing unit 107′″ includes decoding/inverse wavelet transform units 2501 to 2505, the shift-and-add operation unit 803, and the adder unit 804.

Figure 13A:
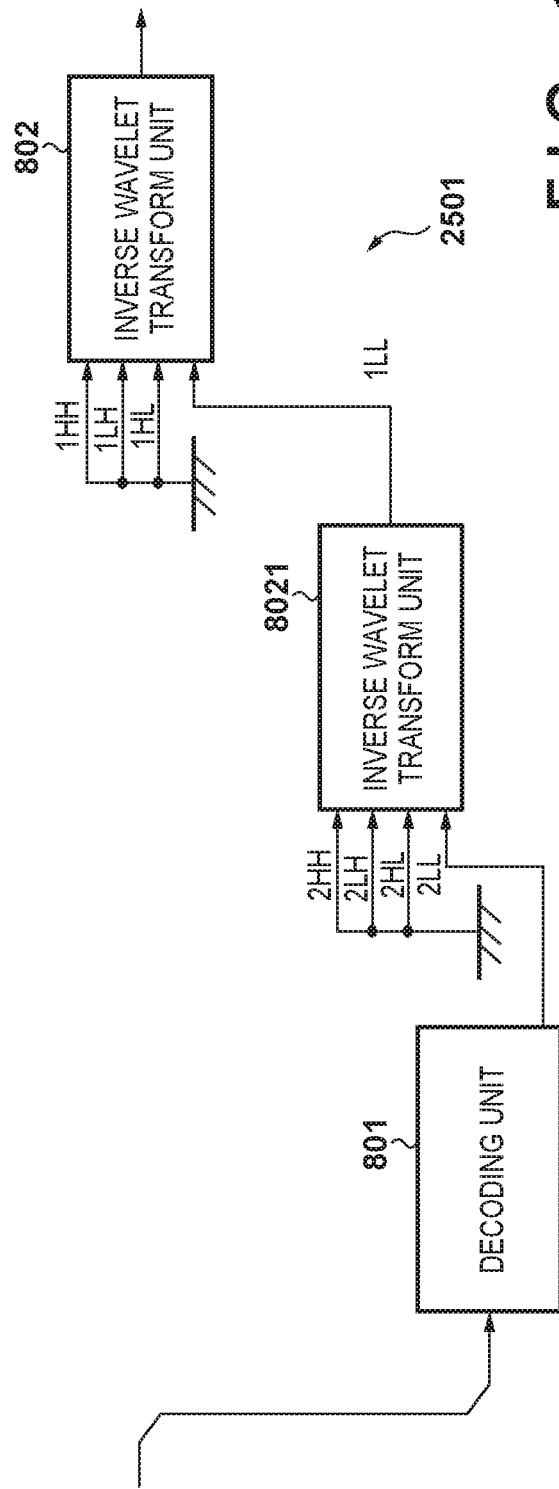
FIGS. 13A and 13B relate to the details of FIG. 12.

FIG. 13A is a block diagram illustrating a functional configuration example of the decoding/inverse wavelet transform unit 2501, which processes the encoded data of the base image (A+B+C+D). The decoding unit 801 decodes the encoded data of the scaling coefficient (2LL) at decomposition level 2, and supplies the decoded data to an inverse wavelet transform unit 8021. The inverse wavelet transform unit 8021 performs inverse wavelet transform with the wavelet expansion coefficients (2LH, 2HL, and 2HH) at decomposition level 2 being 0 to generate the scaling coefficient (1LL) at decomposition level 1, and supplies the generated scaling coefficient (1LL) to the inverse wavelet transform unit 802. The inverse wavelet transform unit 802 performs inverse wavelet transform with the wavelet expansion coefficients (1LH, 1HL, and 1HH) at decomposition level 1 being 0, to obtain the base image.

Figure 13B:
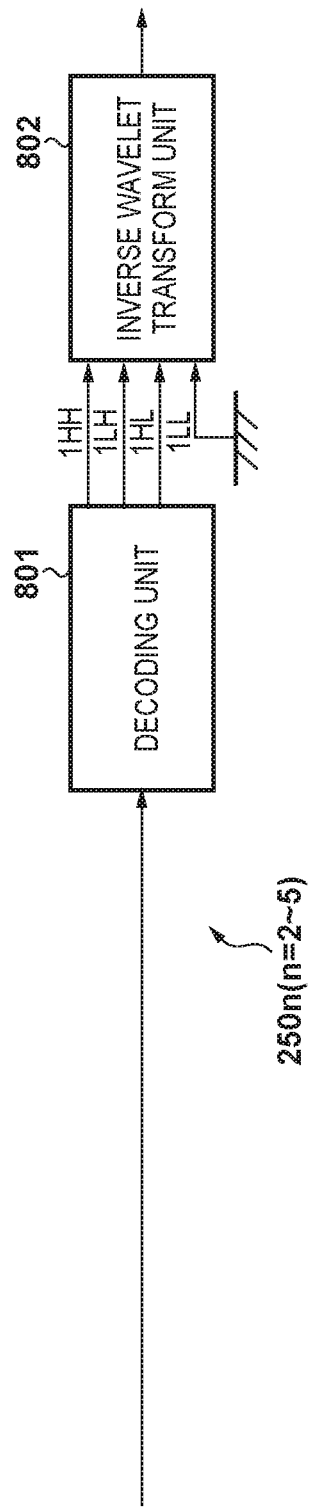

FIG. 13B is a block diagram illustrating a functional configuration example of the decoding/inverse wavelet transform unit 250n (n=2 to 5) for processing the encoded data of the parallax images (images A to D). Even if the decomposition level is 2 or higher, it does not affect the wavelet expansion coefficients (1LH, 1HL, and 1HH) at decomposition level 1, and therefore, operations of the decoding unit 801 and the inverse wavelet transform unit 802 are the same as those at decomposition level 1.

If wavelet transform is performed at up to decomposition level 2, the amount of computation increases, whereas the spatial frequency band covered by the parallax image data expands in the low-frequency direction, and accordingly the shift amount in the shift-and-add operation unit 803 can be increased. That is to say, the refocusable area can be expanded. Note that the number of decomposition levels may be increased to 3 or more.

The first embodiment has been described thus far, including various modifications. In this embodiment, the base image obtained by combining a plurality of parallax images and the parallax images are respectively subjected to two-dimensional sub-band division. As for the base image, the coefficient of the lowest-frequency sub-band is encoded. As for the parallax images, the coefficients of the remaining sub-bands are encoded. This configuration can reduce the amount of encoded data compared with the case of encoding a plurality of parallax images, without restricting the use of the parallax images.

For this reason, if, for example, a plurality of parallax images are used to generate a refocused image, any area in the images can be subjected to refocusing. It is also possible to increase the frame rate during image capture and the number of images that can be continuously captured, without changing the configuration of the image capture apparatus. Note that the usage of parallax images to which the present invention is applied is not limited to generation of a refocused image. For example, the present invention is also applicable to parallax images to be used in automatic focus detection. In this case, an increase in the frame rate when capturing parallax images as a result of applying the present invention will shorten the time required for automatic focus detection.

Second Embodiment

Next, the second embodiment of the present invention will be described. Note that this embodiment can be carried out by the same functional configuration as that of the digital camera 100 described in the first embodiment. Thus, the second embodiment will be described using the same reference numerals as those in the first embodiment. In this embodiment, the number of parallax images to be encoded is reduced in a configuration for encoding second images that correspond to two first images.

Figure 14A:
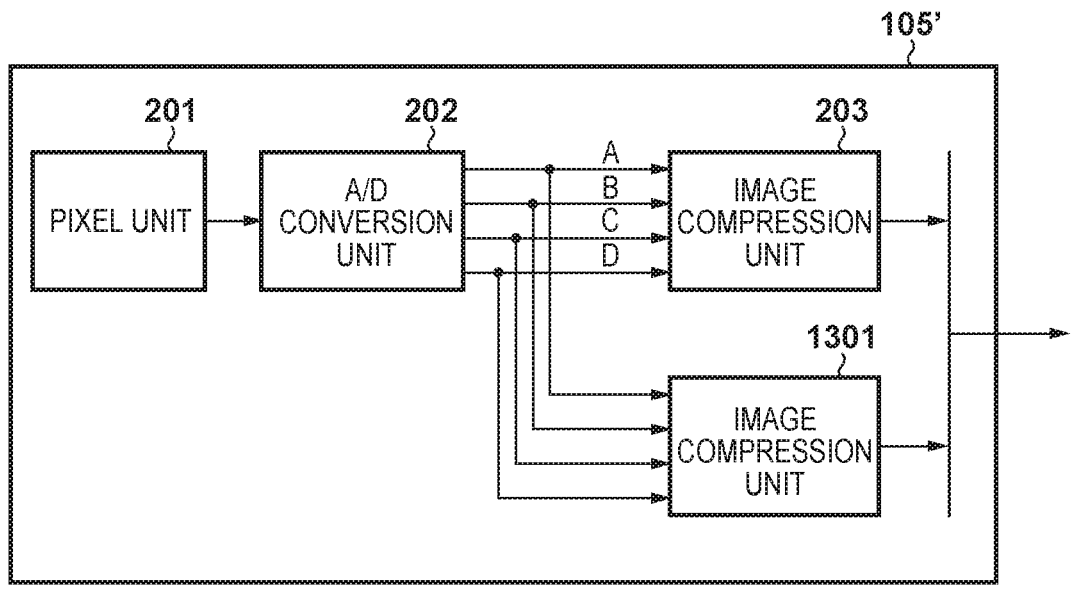
FIGS. 14A and 14B relate to the image capture unit and the image compression unit of the digital camera according to a second embodiment.

FIG. 14A is a block diagram illustrating a functional configuration example of an image capture unit 105' according to this embodiment, where the same constituent elements as those in FIG. 2A are assigned the same reference numerals. The image capture unit 105' according to this embodiment differs from the image capture unit according to the first embodiment in that a second image compression unit 1301 is additionally provided.

Figure 14B:
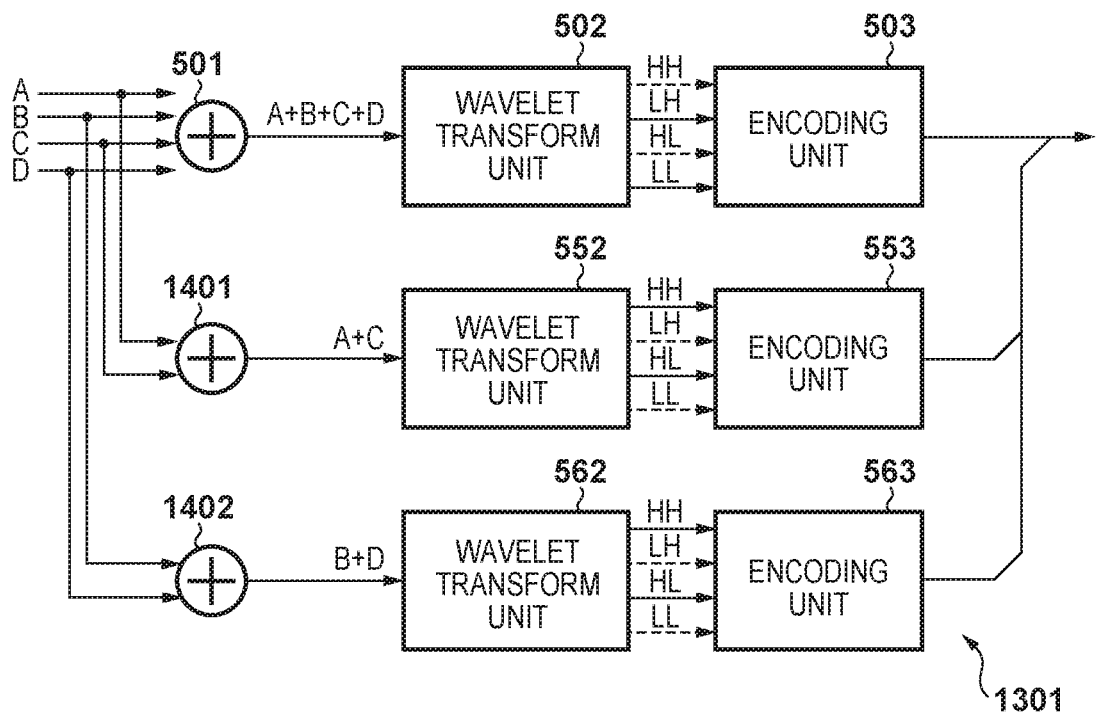

FIG. 14B is a block diagram illustrating a functional configuration example of the added image compression unit 1301, where the same functional blocks as those included in the image compression unit 203 are assigned the same reference numerals as those in FIG. 3.

The wavelet transform unit 502 in the image compression unit 1301 performs wavelet transform at decomposition level 1 on the base image, and supplies, to the encoding unit 503, one (1LH) of the expansion coefficients at decomposition level 1, in addition to the scaling coefficient (1LL) at decomposition level 1. The encoding unit 503 performs encoding with the remaining expansion coefficients (1HL and 1HH) being 0.

Adder units 1401 and 1402 respectively add two parallax images. Specifically, the adder unit 1401 adds the image A and the image C, and the adder unit 1402 adds the image B and the image D. Each of the adder units 1401 and 1402 generates a parallax image (second image) to be encoded that corresponds to two first images. As a result of this addition, a pair of parallax images is obtained, the parallax images being subjected to pupil division only in the horizontal direction. Information regarding parallax in the vertical direction is lost as a result of this addition, and accordingly the shift direction in the refocusing is limited to the horizontal direction, but the effect of reducing encoded data is enhanced. Accordingly, by selectively using the image compression units 203 and 1301, it is possible to select which of flexibility in refocusing and a reduction in encoded data (an increase in the frame rate or the number of images that can be continuously captured) the priority should be given whether to give priority to flexibility in refocusing or a reduction in encoded data. Note that addition may also be performed in another manner, e.g. the adder unit 1401 may add the image A and the image B, and the adder unit 1402 may add the image C and the image D.

As a result of the addition performed by the adder units 1401 and 1402, the wavelet expansion coefficients needed for the parallax images are only coefficients relating to the horizontal direction. For this reason, the wavelet transform unit 502 for processing the base image outputs sub-bands LH and LL that correspond to horizontal scaling coefficients. Also, each of the wavelet transform units 512 and 522 for processing the parallax images outputs sub-bands HL and HH that correspond to horizontal wavelet expansion coefficients. Note that, when recording the encoded data to the recording medium 108, the control unit 101 includes, in a header or the like of a data file, information regarding the decomposition level of wavelet transform and sub-bands recorded for the base image and the parallax images.

In this case, if the number of pixels of an original image is 1, the number of encoded data is $\frac{1}{2}+\frac{1}{2}\times 2=(1+\frac{1}{2})$, and can be reduced to $(1+\frac{1}{2})/2=75\%$ compared with the case of encoding two parallax images as-is.

The number of encoded data can be reduced to $(3+\frac{1}{4})/4=81\%$ in the first embodiment in which pupil division is performed in both the horizontal and vertical directions, whereas the second embodiment can realize a higher reduction rate.

Figure 15A:
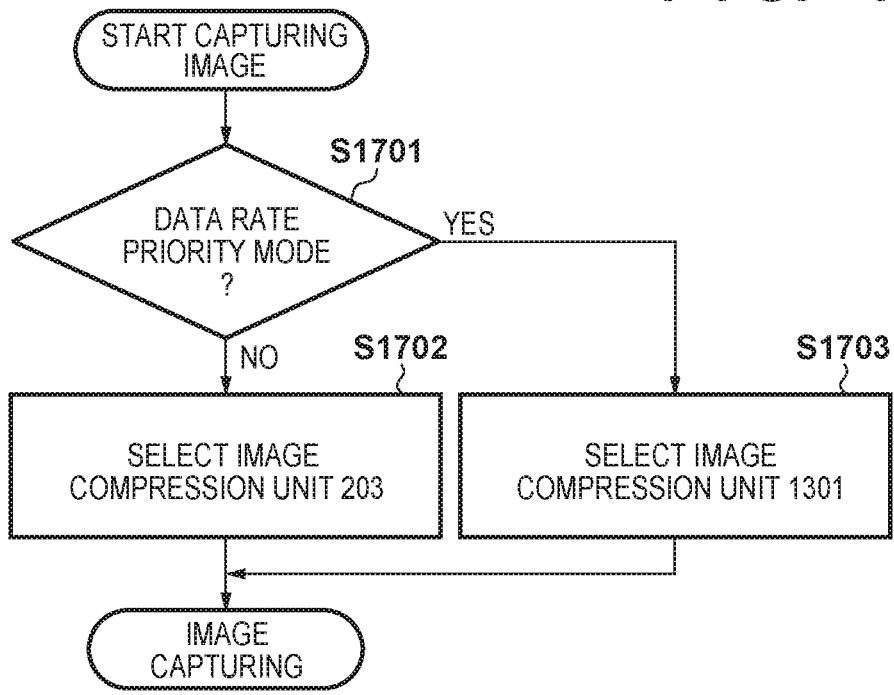
FIGS. 15A and 15B are flowcharts relating to an image capture operation and a refocusing operation according to the second embodiment.

FIG. 15A is a flowchart relating to an operation of the control unit 101 in the case of selectively using the image compression units 203 and 1301 in accordance with mode selection by the user, as an example. The control unit 101 can perform this operation when an operation to input an image capture instruction (e.g. an instruction to start capturing a still image or a moving image) having been made to the operation unit 109 is detected.

In step S1701, the control unit 101 determines whether or not a data rate priority mode has been selected, advances the processing to step S1703 if it is determined that the data rate priority mode has been selected, and advances the processing to step S1702 if not.

In step S1702, the control unit 101 notifies the image capture unit 105' of selecting the image compression unit 203. In step S1703, the control unit 101 notifies the image capture unit 105' of selecting the image compression unit 1301. Thereafter, the control unit 101 starts image capturing. During the image capturing, the image capture unit 105' outputs encoded data generated by the image compression unit selected by the control unit 101. Note that the image capture unit 105' may stop the operation of the image compression unit that has not been selected.

Note that whether or not the data rate priority mode has been selected can be determined by referencing the ROM 102, for example. Also, the control unit 101 may perform similar control based on whether or not an image capture mode has been set in which priority is to be given to the data rate.

Figure 16A:
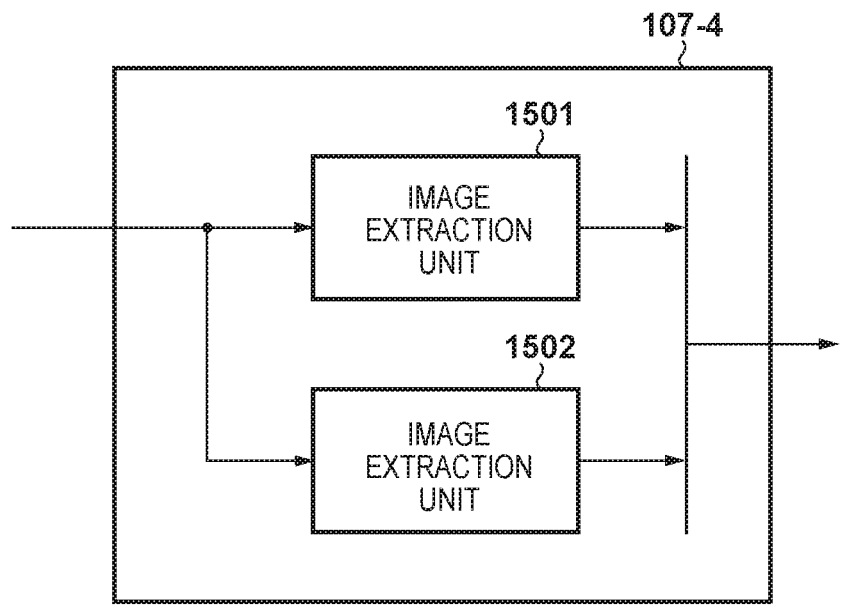
FIGS. 16A and 16B relate to a functional configuration of the image processing unit of the digital camera according to the second embodiment.

FIG. 16A is a block diagram illustrating a functional configuration example of an image processing unit 107-4 according to this embodiment. The image processing unit 170-4 according to this embodiment includes two image extraction units 1501 and 1502. Here, the image extraction unit 1501 has the same configuration as that of the image processing unit 107 shown in FIG. 6A.

Figure 16B:
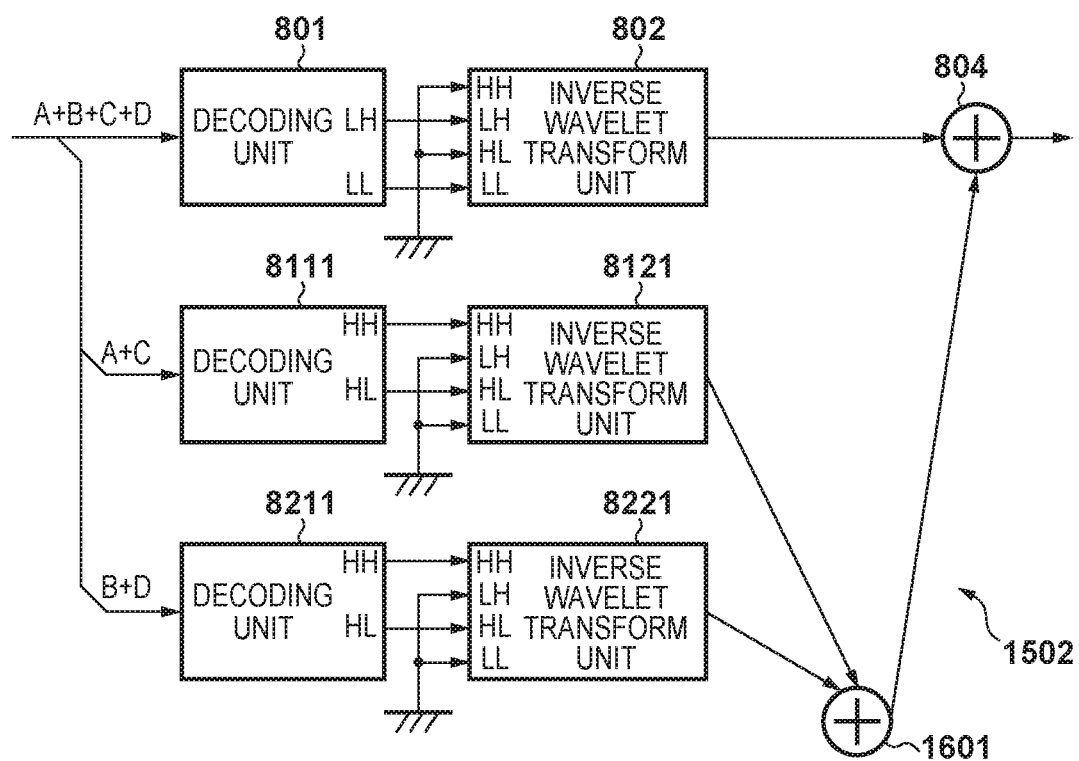

FIG. 16B is a block diagram illustrating a functional configuration example of the image extraction unit 1502. The image extraction unit 1502 extracts encoded data that has been recorded in the data rate priority mode (i.e. generated by the image compression unit 1301).

The decoding unit 801 decodes the encoded data of the base image, and supplies the wavelet coefficients for 1LL and 1LH to the inverse wavelet transform unit 802. The inverse wavelet transform unit 802 performs inverse wavelet transform with the wavelet coefficients for 1HL and 1HH being 0, and outputs the obtained base image to the adder 804.

A decoding unit 8111 and a decoding unit 8211 decode the encoded data of the image A+C and the encoded data of the image B+D, respectively, and output the wavelet coefficients for 1HH and 1HL to inverse wavelet transform units 8121 and 8221, respectively. The inverse wavelet transform units 8121 and 8221 perform inverse wavelet transform with the wavelet coefficients for 1LL and 1LH being 0, and output the obtained image A+C and the image B+D to a shift-and-add operation unit 1601. The shift-and-add operation unit 1601 generates a refocused image by performing a shift-and-add operation in the horizontal direction.

The adder unit 804 adds the base image that has been subjected to inverse wavelet transform with only the horizontal scaling coefficients and the refocused image generated using the parallax images that have been subjected to inverse wavelet transform with only the horizontal wavelet expansion coefficients, and generates a refocused base image.

Figure 15B:
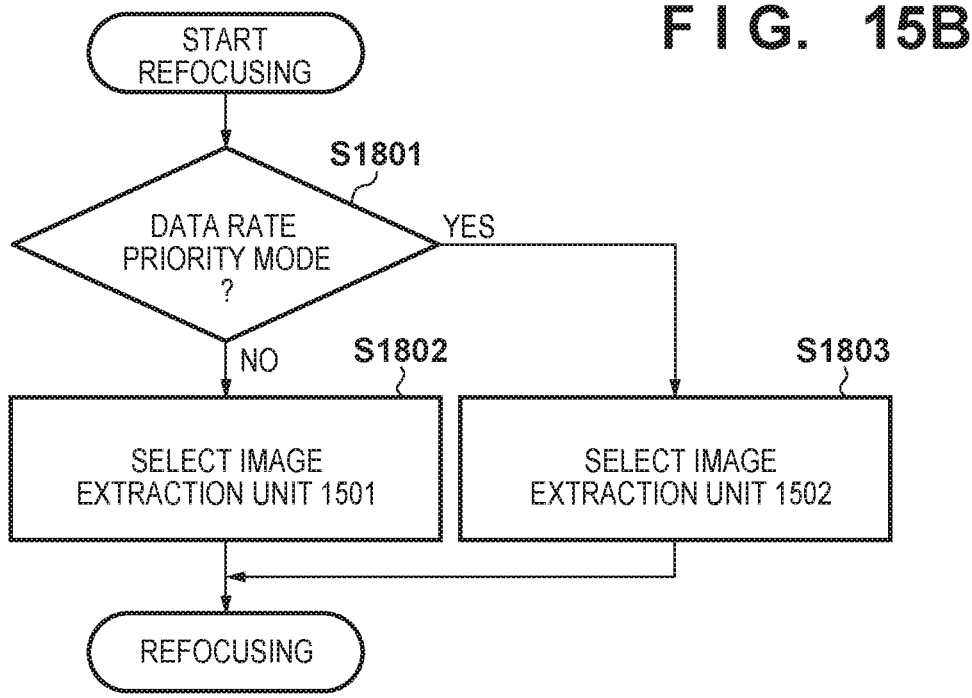

FIG. 15B is a flowchart relating to an operation of the control unit 101 during refocusing. The control unit 101 can perform refocusing, which is an example of processing using parallax images, when an instruction to start refocusing is given through the operation unit 109. In step S1801, the control unit 101 determines whether or not encoded data is recorded in the data rate priority mode, based on header information of a read data file. The control unit 101 advances the processing to step S1803 if it is determined that the encoded data is recorded in the data rate priority mode, and advances the processing to step S1802 if not. In step S1802, the control unit 101 selects the image extraction unit 1501, and notifies the image processing unit 107-4 of this selection. In step S1803, the control unit 101 selects the image extraction unit 1502, and notifies the image processing unit 107-4 of this selection. Thereafter, the control unit 101 starts refocusing. The image processing unit 107-4 outputs an image that is output by the image extraction unit regarding which a notification has been given. Note that the image processing unit 107-4 may stop the operation of the image extraction unit that has not been selected. Also, the control unit 101 may also perform the processing in FIG. 15B at another timing, e.g. when loading the encoded data to the RAM 103.

According to this embodiment, it is possible to select whether to perform encoding while reducing the number of parallax images, or to perform encoding without reducing the number of parallax images. For this reason, for example, control can be performed so as to reduce the number of parallax images when capturing an image of a subject that is moving fast, and to not reduce the number of parallax images when capturing a subject that is moving slowly. In other words, it is possible to dynamically switch between giving priority to the use range of parallax images and giving priority to the frame rate or the number of images that can be continuously captured. Note that this switching may be performed based on an explicit instruction given by the user, or may be automatically performed by the image capture apparatus in accordance with subject information detected in a captured image.

Third Embodiment

Next, the third embodiment of the present invention will be described. Note that this embodiment can be carried out by the same functional configuration as that of the digital camera 100 described in the first embodiment. Thus, the third embodiment will be described using the same reference numerals as those in the first embodiment.

The second embodiment makes it possible to dynamically select whether or not to reduce the number of parallax images to be encoded. The third embodiment makes it possible to dynamically change the decomposition level of wavelet transform.

FIG. 17A is a block diagram illustrating a functional configuration example in the case of configuring each of the wavelet transform/encoding units 1901 to 1905 included in the image compression unit 203″ shown in FIG. 10, so as to be able to selectively perform wavelet transform at decomposition level 3 and encoding.

The wavelet transform/encoding unit 190$n$ ($n$=0 to 5) includes three wavelet transform units 502, 5021, and 5022, which are connected directly, and encoding units 503′, 5031, and 5032, which encode the output of the respective wavelet transform units. The encoding units 503′, 5031, and 5032 outputs encoded data of wavelet coefficients at decomposition levels 1 to 3, respectively. All of the encoding units and wavelet transform units respectively have the same configuration.

Selective wavelet transform at decomposition levels 1, 2, and 3 and generation of encoded data are realized using the wavelet transform/encoding units 1901 to 1905 that have the above-described configuration. In the following description, an operation to perform wavelet transform at decomposition level m (m=1 to 3) and generate encoded data is called a decomposition level-m transmission mode.

Figure 17B:
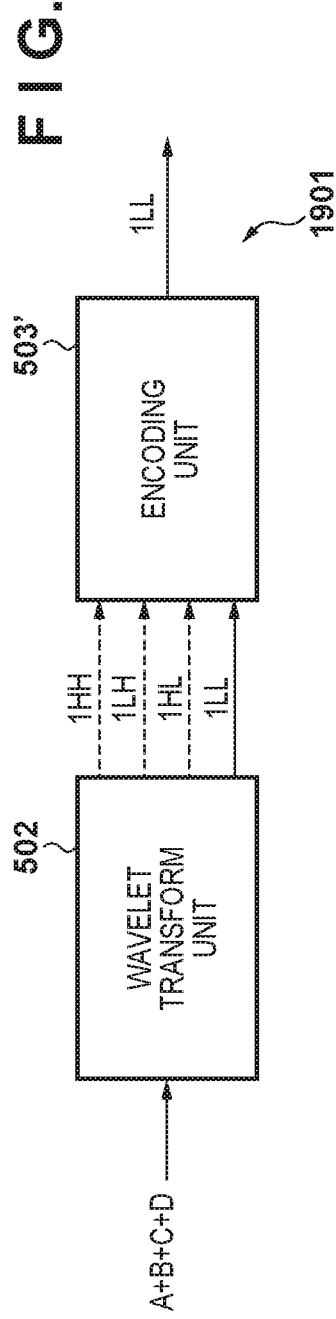

FIG. 17B illustrates an operation in the decomposition level-1 transmission mode of the wavelet transform/encoding unit 1901. The wavelet transform unit 502 performs wavelet transform at decomposition level 1 on the base image, and supplies only the scaling coefficient (1LL) at decomposition level 1 to the encoding unit 503′. The encoding unit 503′ outputs encoded data of the scaling coefficient (1LL) at decomposition level 1. This is equal to the operations of the wavelet transform unit 502 and the encoding unit 503 in the image compression unit 203 shown in FIG. 3.

Figure 17C:
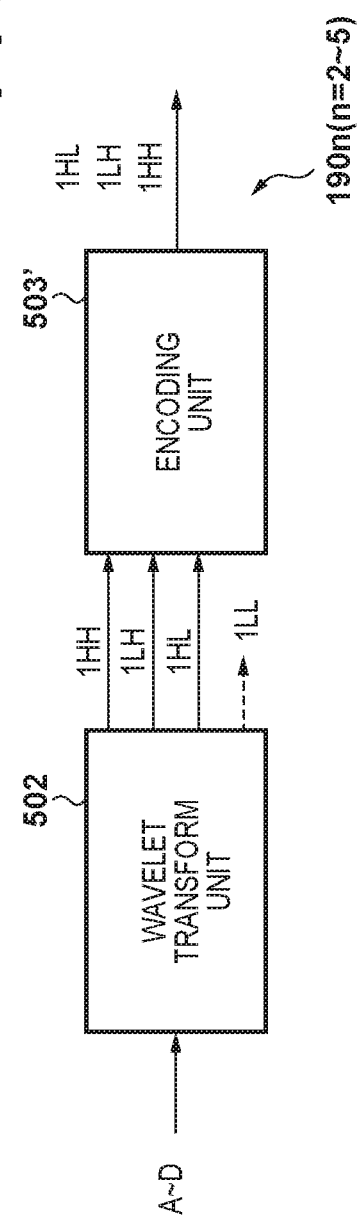

FIG. 17C illustrates an operation in the decomposition level-1 transmission mode of the wavelet transform/encoding unit 190$n$ ($n$=2 to 5). The wavelet transform unit 502 performs wavelet transform at decomposition level 1 on one of the parallax images (images A to D), and supplies only the wavelet expansion coefficients (1HL, 1LH, and 1HH) at decomposition level 1 to the encoding unit 503′. The encoding unit 503′ outputs encoded data of the wavelet expansion coefficients (1HL, 1LH, and 1HH) at decomposition level 1. This is equal to the operations of the wavelet transform unit 5$n$2 and the encoding unit 5$n$3 ($n$=1 to 4) in the image compression unit 203 shown in FIG. 3.

The operation in the decomposition level-2 transmission mode of the wavelet transform/encoding unit 1901 and the operation in the decomposition level-2 transmission mode of the wavelet transform/encoding unit 190$n$ ($n$=2 to 5) are as shown in FIGS. 11A and 11B, respectively.

The operation in the decomposition level-3 transmission mode of the wavelet transform/encoding unit 1901 corresponds to an operation to output only the encoded data of the scaling coefficient (3LL) at decomposition level 3 from the encoding unit 5032 in FIG. 17A. The operation in the decomposition level-3 transmission mode of the wavelet transform/encoding unit $190n$ (n=2 to 5) corresponds to an operation to output all encoded data, excluding 1LL and 2LL, from the encoding units 503', 5031, and 5032 in FIG. 17A.

The image compression unit 203" switches between operations of the wavelet transform units 502, 5021, and 5022 and the encoding units 503', 5031, and 5032, in accordance with the decomposition level designated by the control unit 101. The encoding unit of the wavelet transform/encoding unit 1901 outputs only the scaling coefficient, and the encoding units of the wavelet transform/encoding units 1902 to 1905 output only the wavelet expansion coefficients.

Figure 18A:
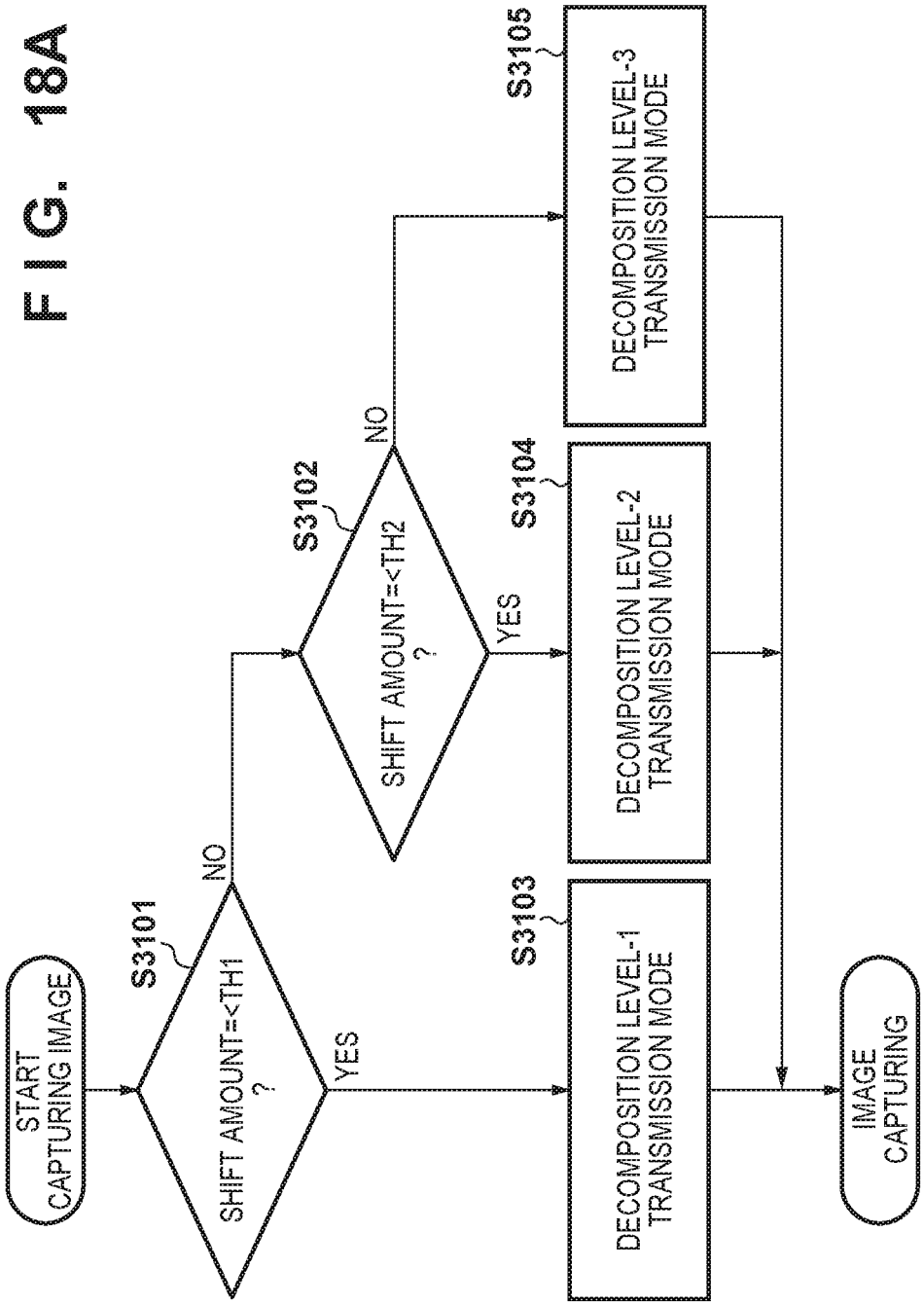

FIG. 18A is a flowchart relating to an operation of the control unit 101 to switch the decomposition level or the transmission mode level in accordance with the setting of the refocusing area, as an example. The control unit 101 can perform this operation when an operation to input an image capture instruction (e.g. an instruction to start capturing a still image or a moving image) having been made to the operation unit 109 is detected. The setting of the refocusing area can be stored in the ROM 102. In this embodiment, the refocusing area is stored as a shift amount, but any set value that is equal to the number of switchable decomposition levels may be stored instead. The method for setting the refocusing area is not particularly limited, and for example, the user may be made to set the refocusing area through a menu screen. In this case, the user may be made to directly set a shift amount, or may be made to select the refocusing area from "large", "medium", and "small".

In step S3101, the control unit 101 determines whether or not the shift amount is smaller than or equal to a threshold TH1. The control unit 101 advances the processing to step S3103 if it is determined that the shift amount is smaller than or equal to the threshold TH1, and advances the processing to step S3102 if not.

In step S3102, the control unit 101 determines whether or not the shift amount is smaller than or equal to a threshold TH2 (TH2>TH1). The control unit 101 advances the processing to step S3104 if it is determined that the shift amount is smaller than or equal to the threshold TH2, and advances the processing to step S3105 if not.

The thresholds TH1 and TH2 can be determined in advance in accordance with the relationship between the decomposition level of wavelet transform and the refocusable area, and can be stored in the ROM 102. In the case where the shift amount may be small, and the refocusing area may be narrow, the decomposition level of the wavelet expansion coefficients for the parallax images can be lowered. This configuration makes it possible to efficiently reduce encoded data in accordance with the refocusing amount needed.

In step S3103, the control unit 101 selects the level-1 transmission mode (wavelet decomposition level 1), and notifies the image capture unit 105 of this selection. Similarly, the control unit 101 selects the level-2 transmission mode (wavelet decomposition level 2) in step S3104, selects the level-3 transmission mode (wavelet decomposition level 3) in step S3105, and notifies the image capture unit 105 of this selection. Thereafter, the control unit 101 starts image capturing. During the image capturing, the image capture unit 105 outputs encoded data corresponding to the transmission mode (decomposition level) selected by the control unit 101.

FIG. 19A is a block diagram illustrating a functional configuration example in the case of configuring each of the decoding/inverse wavelet transform units 2501 to 2505 included in the image processing unit 107''' shown in FIG. 12 to be able to selectively perform inverse wavelet transform at decomposition level 3 and decoding.

The decoding/inverse wavelet transform unit $250n$ (n=0 to 5) includes decoding units 801, 8011, and 8012 that decode encoded data of coefficients at decomposition levels 1 to 3, respectively, and inverse wavelet transform units 802, 8021, and 8022. The decoding units 801, 8011, and 8012 output wavelet coefficients corresponding to the respective decomposition levels at the time of recording. All of the decoding units and inverse wavelet transform units respectively have the same configuration.

The encoded data of the coefficients at decomposition levels 1, 2, and 3 are decoded and subjected to inverse wavelet transform, using the decoding/inverse wavelet transform units 2501 to 2505 that have the above-described configuration.

Figure 19B:
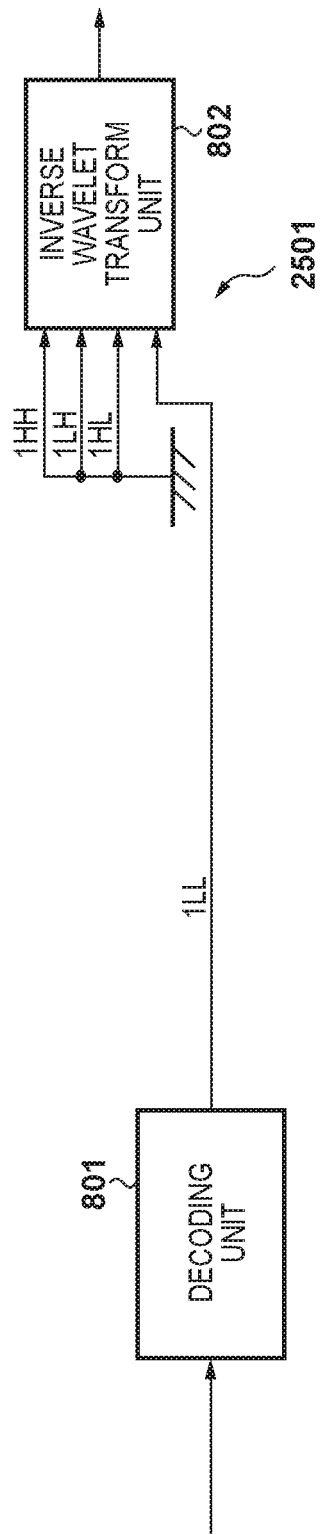

FIG. 19B illustrates an operation in the decomposition level-1 transmission mode of the decoding/inverse wavelet transform unit 2501. The decoding unit 801 decodes encoded data of the coefficients at decomposition level 1, and supplies only the scaling coefficient (1LL) to the inverse wavelet transform unit 802. This is equal to the operations of the inverse wavelet transform unit 802 and the decoding unit 801 in the image processing unit 107 shown in FIG. 6A. The inverse wavelet transform unit 802 performs inverse wavelet transform on the scaling coefficient (1LL) at decomposition level 1, with the wavelet expansion coefficients (1HL, 1LH, and 1HH) being 0.

Figure 19C:
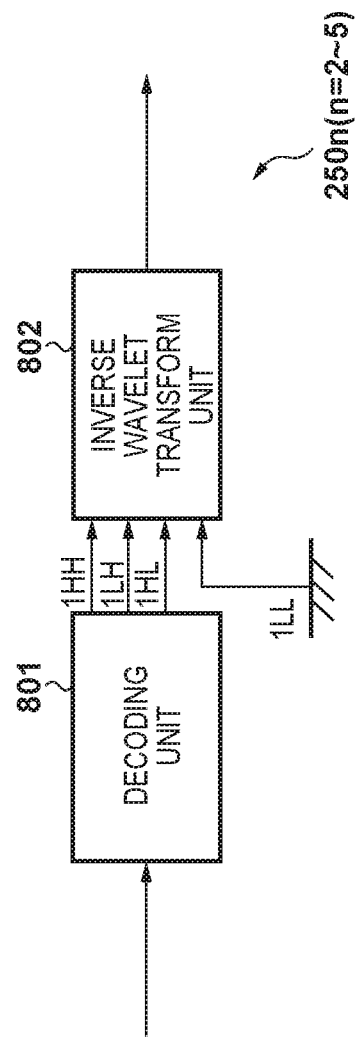

FIG. 19C illustrates an operation in the decomposition level-1 transmission mode of the decoding/inverse wavelet transform unit $250n$ (n=2 to 5). The decoding unit 801 supplies only the result of decoding the encoded data of the wavelet expansion coefficients (1HL, 1LH, and 1HH) at decomposition level 1, out of the encoded data of one of the parallax images (images A to D), to the inverse wavelet transform unit 802. This is equal to the operation of the decoding unit $8n1$ (n=1 to 4) in the image processing unit 107 shown in FIG. 6A. The inverse wavelet transform unit 802 performs inverse wavelet transform on the wavelet expansion coefficients (1HL, 1LH, and 1HH) at decomposition level 1, with the scaling coefficient (1LL) being 0.

The operation in the decomposition level-2 transmission mode of the decoding/inverse wavelet transform unit 2501 is as illustrated in FIG. 13A, and the operation in the decomposition level-2 transmission mode of the decoding/inverse wavelet transform unit $250n$ (n=2 to 5) is as shown in FIG. 13B.

The operation in the decomposition level-3 transmission mode of the decoding/inverse wavelet transform unit 2501 is as follows. The inverse wavelet transform unit 802 in FIG. 19A performs inverse wavelet transform on the scaling coefficient (1LL) at decomposition level 1 obtained from the inverse wavelet transform unit 8021, with the wavelet expansion coefficients (1HL, 1LH, and 1HH) being 0.

The operation of the decomposition level-3 transmission mode of the decoding/inverse wavelet transform unit $250n$ (n=2 to 5) is the same as that in the decomposition level-1 transmission mode.

FIG. 18B is a flowchart relating to an operation of the control unit 101 during refocusing. The control unit 101 can perform refocusing, which is an example of processing using parallax images, when an instruction to start refocusing is given through the operation unit 109. In step S3201, the control unit 101 determines whether or not the decomposition level of encoded coefficients is 1, based on header information of a read data file. The control unit 101 advances the processing to step S3203 if it is determined that decomposition level is 1, and advances the processing to step S3202 if not.

In step S3202, the control unit 101 determines whether or not the decomposition level of the encoded coefficients is 2. The control unit 101 advances the processing to step S3204 if it is determined that decomposition level is 2, and advances the processing to step S3205 if not.

In steps S3203 to S3205, the control unit 101 sets the level of the refocusing mode to level 1 to level 3, respectively, and starts refocusing corresponding to the refocusing mode (e.g. displays a GUI for designating a refocusing position). Here, the refocusing mode corresponds to the upper limit of the refocusing amount, and the upper limit of the refocusing amount at level 1 is the smallest. That is to say, the distance range in which the focus can be changed is narrow.

During subsequent refocusing, the control unit 101 can accept a refocusing instruction from the user in the range corresponding to the set refocusing mode, for example. For example, when a position is designated in the base image displayed on the display unit 110, the control unit 101 can determine whether or not a refocused image in which the designated position comes into focus can be generated, within the range of the shift amount that corresponds to the current refocusing mode. If it is determined that refocusing cannot be performed on the designated position within the range of the shift amount that corresponds to the refocusing mode, the control unit 101 can warn the user by, for example, displaying a message on the display unit 110.

A configuration can also be employed in which the transmission mode is selected based on conditions other than the shift amount. For example, a configuration is possible in which the depth of field is calculated based on the F-number, magnification, or the like, and the transmission mode at a lower (higher) decomposition level is selected as the depth of field is larger (smaller).

Figure 20:
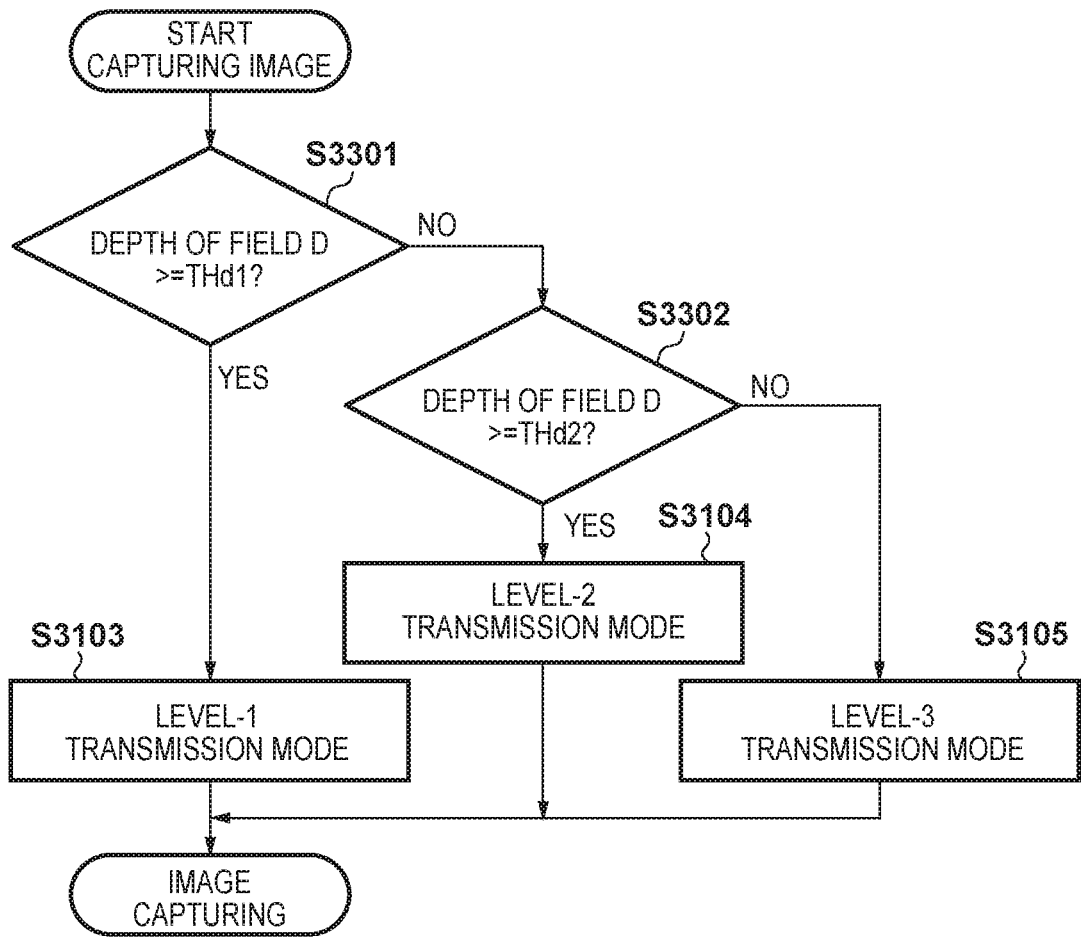
FIG. 20 is a flowchart relating to an image capture operation according to the third embodiment.

In this case, the above-described operation in FIG. 18A need only be changed as illustrated in FIG. 20.

That is to say, in step S3301, the control unit 101 determines whether or not the depth of field D is greater than or equal to a threshold THd1. The control unit 101 advances the processing to step S3103 if it is determined that the depth of field D is greater than or equal to the threshold THd1, and advances the processing to step S3302 if not.

In step S3302, the control unit 101 determines whether or not the depth of field D is greater than or equal to a threshold THd2 (THd2<THd1). The control unit 101 advances the processing to step S3104 if it is determined that the depth of field D is greater than the threshold THd2, and advances the processing to step S3105 if not.

The thresholds THd1 and THd2 can be determined in advance in accordance with the relationship between the decomposition level of wavelet transform and the refocusable area, and can be stored in the ROM 102. If the depth of field is large, the parallax between parallax images is small, and the refocusable area is narrow. Accordingly, the decomposition level of the wavelet expansion coefficients for the parallax images can be lowered. This configuration makes it possible to efficiently reduce encoded data in accordance with the refocusing amount needed. Processing in steps S3103 to S3105 is the same as that in FIG. 18A, and a description thereof is omitted accordingly. This configuration makes it possible to efficiently reduce encoded data in accordance with the depth of field.

According to this embodiment, the decomposition level of sub-band division can be dynamically changed. As a result, the decomposition level can be restrained from unnecessarily increasing, and the computational costs and the amount of encoded data can be reduced appropriately.

Fourth Embodiment

Next, the fourth embodiment of the present invention will be described. Note that this embodiment can be carried out by the same functional configuration as that of the digital camera 100 described in the first embodiment. Thus, the fourth embodiment will be described using the same reference numerals as those in the first embodiment.

FIG. 21A is a block diagram illustrating a functional configuration example of an image capture unit 105″ according to this embodiment. The same constituent elements as those in the first embodiment are assigned the same reference numerals as those in FIG. 2A. The image capture unit 105″ according to this embodiment includes a RAM 3401, which stores an immediately previously captured image (moving image frame or still image). In the following description, an image that has been stored in the RAM 3401 is called an image of the previous frame (n−1), and an image that is captured at this time is called an image of the current frame n. The image of the previous frame (n−1) corresponds to a past image with respect to the image of the current frame n.

Figure 21B:
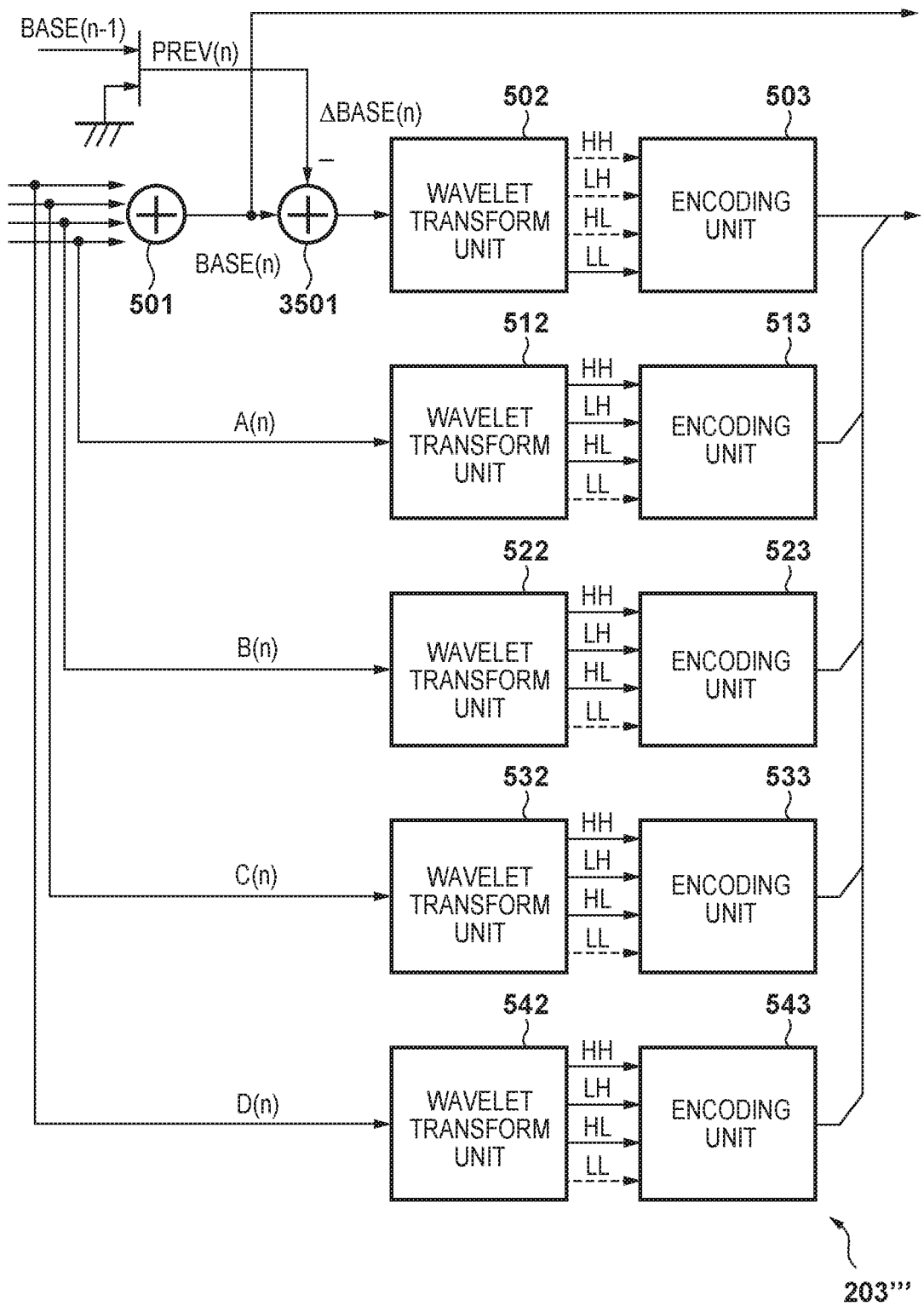

FIG. 21B is a block diagram illustrating a functional configuration example of an image compression unit 203‴ in FIG. 21A. The wavelet transform unit 5n1 (n=0 to 4) and the encoding unit 5n3 (n=0 to 4) have the configuration described using FIG. 3 in the first embodiment. As is clear from comparison between FIG. 3 and FIG. 21B, the image compression unit 203‴ according to this embodiment includes an adder unit 3501.

The control unit 101 reads out a base image BASE(n−1) of the previous frame (n−1) stored in the RAM 3401, and supplies the read base image BASE(n−1) to the adder unit 3501 in the image compression unit 203″. The adder unit 3501 subtracts the base image BASE(n−1) from a base image BASE(n) of the current frame n to generate a difference image ΔBASE(n), and supplies the generated difference image ΔBASE(n) to the wavelet transform unit 502. In other words, the adder unit 3501 generates the difference image ΔBASE(n) as an error in inter-frame prediction, using the base image BASE(n−1) as a predicted image. Accordingly, in the following description, the base image BASE(n−1) is called a predicted image PREV(n) for the base image BASE(n). The control unit 101 stores the base image BASE(n) of the current frame n in the RAM 3401 to use the base image BASE(n) as a predicted image for the base image of the next frame. Thus, in this embodiment, the amount of encoded data is reduced by thus employing a configuration in which an inter-frame prediction error (difference image) in the base images is subjected to wavelet transform and encoded.

Figure 22:
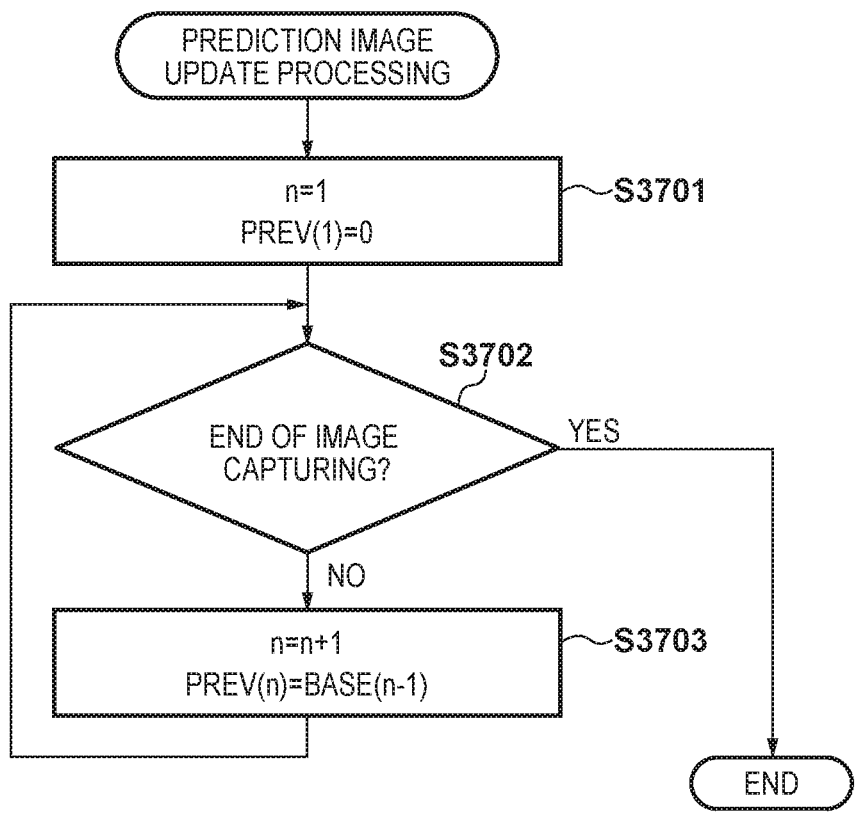
FIG. 22 is a flowchart relating predicted image update processing according to the fourth embodiment.

FIG. 22A is a flowchart relating to predicted image update processing performed by the control unit 101 in this embodiment. This processing can be performed in parallel with image capturing for recording, for example. Here, this processing is performed during capturing of moving image or continuous capturing of still images during which the previous frame and the current frame are highly correlated, but may also be performed when a single still image is captured.

In step S3701, the control unit 101 performs initialization. Here, initialization includes setting the variable n to 1, and preparing an initial predicted image PREV(1). PREV(1)

may be an image in which color components of all pixels have a fixed value, for example. Here, the fixed value is 0.

In step S3702, the control unit 101 determines whether or not the capturing of an image has ended, ends the predicted image update processing if the capturing of an image has ended, and advances the processing to step S3703 if not. The end of the capturing of an image can be determined based on whether or not a predetermined state, such as an instruction to end the recording of a moving image being given, or pressing of a release button being ended, has been detected.

In step S3703, the control unit 101 increments the variable n by 1, sets the current base image BASE(n−1) as a new predicted image PREV(n), and returns the processing to step S3702. Here, since the variable n is incremented by 1 before updating the predicted image, the frame number of the current base image is (n−1).

As for the base image, only the scaling coefficient (LL) is encoded. Since the scaling coefficient corresponds to an image in the lowest band, there is a tendency that the influence of camera shakes and subject blur is smaller, and the pixel values of the difference image are smaller. Accordingly, the amount of encoded data can be efficiently reduced by inter-frame prediction encoding. In contrast, in parallax images for which the wavelet expansion coefficients (LH, HL, and HH) including high-frequency components of the images are encoded, there is a tendency that the pixel values of the difference image are greater due to the influence of camera shakes and subject blur. Accordingly, the effect of inter-frame prediction encoding is insignificant, and in this embodiment, inter-frame prediction encoding is not performed for parallax images. This configuration can increase the efficiency of reducing the amount of encoded data while suppressing an increase in the RAM capacity and computational costs.

Figure 23:
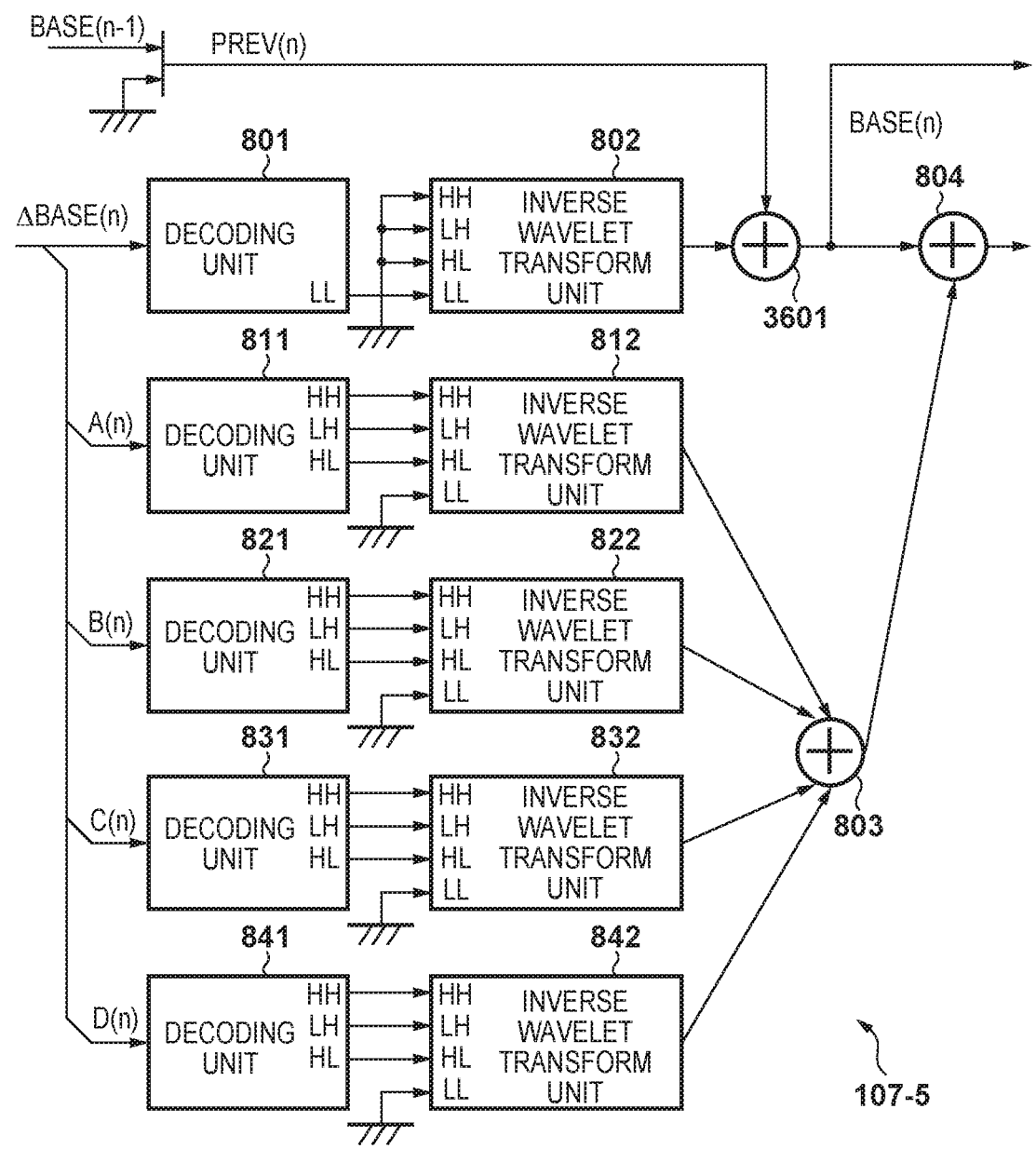
FIG. 23 relates to a functional configuration of the image processing unit of the digital camera according to the fourth embodiment.

FIG. 23 is a block diagram illustrating a functional configuration example of an image processing unit 107-5 according to this embodiment. The image processing unit 107-5 has the same configuration as that of the image processing unit 107 according to the first embodiment shown in FIG. 6A except that the image processing unit 107-5 includes an adder unit 3601, and accordingly, descriptions of the decoding units and the inverse wavelet transform units are omitted. In this embodiment, encoded data of the base image is encoded data of the difference image. For this reason, the adder unit 3601 adds the predicted image (base image of the previous frame) used in the encoding to the output of the inverse wavelet transform unit 802, and restores the base image. The image processing unit 107-5 stores the restored base image in the RAM 103 to use the restored base image in the decoding of the next frame.

As described above, in this embodiment, the base image is subjected to the prediction encoding. As a result, the amount of encoded data of multi-viewpoint images can be reduced, in addition to the effects of the first to third embodiments. Note that the configuration of this embodiment can be combined with the configurations of the first to third embodiments.

Fifth Embodiment

Next, the fifth embodiment of the present invention will be described. Note that this embodiment can be carried out by the same functional configuration as that of the digital camera 100 described in the first embodiment. Thus, the fifth embodiment will be described using the same reference numerals as those in the first embodiment.

FIG. 24A is a block diagram illustrating a functional configuration example of an image capture unit 105''' according to this embodiment. The same constituent elements as those in the first embodiment are assigned the same reference numerals as those in FIG. 2A. The image capture unit 105''' according to this embodiment has a configuration in which a base image compression unit 3901 is additionally provided in the image capture unit 105 according to the first embodiment.

FIG. 24B is a block diagram illustrating a functional configuration example of the base image compression unit 3901. The base image compression unit 3901 only has the configuration relating to the base image, out of the configuration of the image compression unit 203 shown in FIG. 3. However, the wavelet transform unit 502 supplies not only the scaling coefficient (LL) but also the wavelet expansion coefficients (LH, HL, and HH) to the encoding unit 503. The encoding unit 503 then encodes all of the coefficients.

Due to the influence of optical aberration of the imaging lens included in the optical system 104, the resolution in a peripheral area where the image height is larger is lower than the resolution in a center area where the image height is smaller. For this reason, the refocusing effect deteriorates in the peripheral area. In this embodiment using such characteristics, encoded data of parallax images is not included but only encoded data of the base image is included in the peripheral area, thereby reducing the amount of encoded data.

Figure 24C:
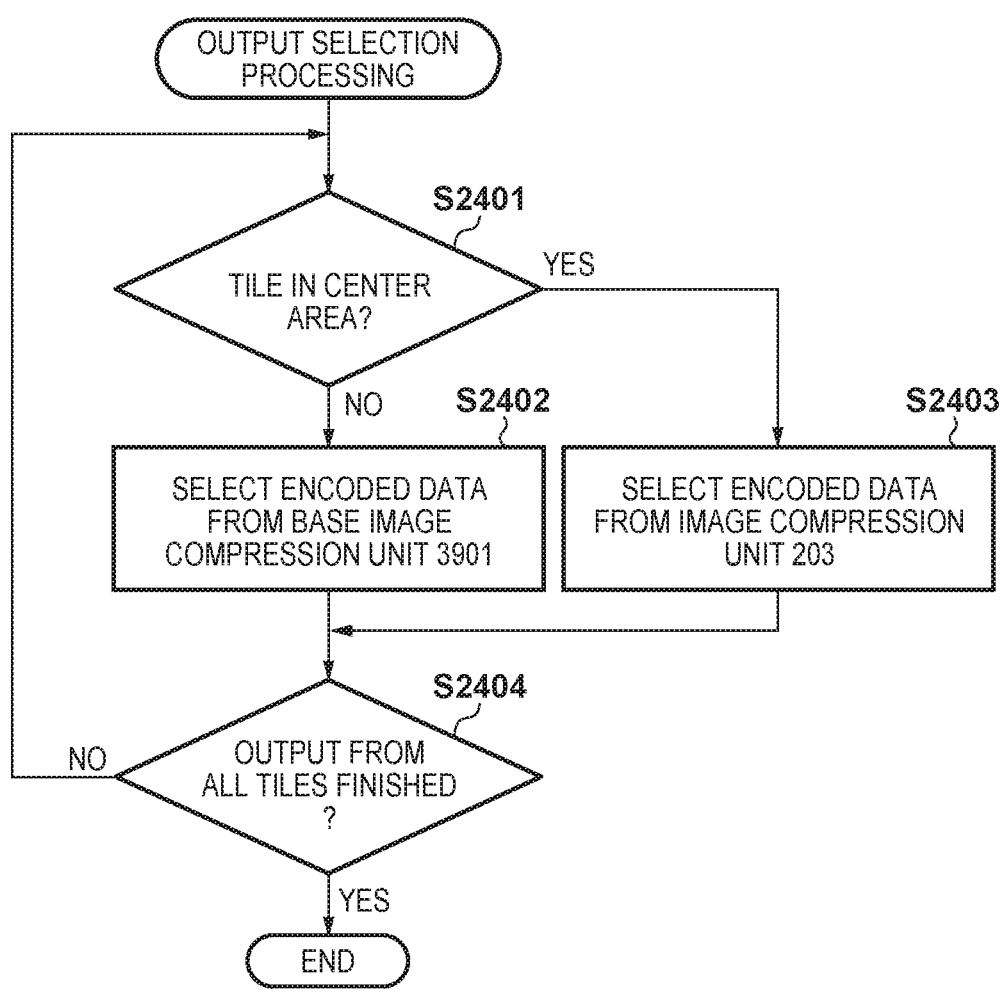

Specifically, while each frame is encoded, the control unit 101 selects encoded data to be output from the image capture unit 105''' as illustrated in the flowchart in FIG. 24C. That is to say, in step S2401, the control unit 101 determines whether or not a tile to be encoded is a tile in a screen center area. Here, "tile" refers to a partial image shown in FIG. 2B, and is an encoding unit. If it is determined that the tile to be encoded is a tile in the screen center area, in step S2403, the control unit 101 instructs the image capture unit 105''' to output encoded data generated by the image compression unit 203. Thus, encoded data of both the base image and parallax images is output, as the encoded data of the tile to be encoded, from image capture unit 105'''. On the other hand, if it is not determined that the tile to be encoded is a tile in the screen center area (i.e. if it is determined that the tile to be encoded is a tile in an image peripheral area), in step S2402, the control unit 101 instructs the image capture unit 105''' to output encoded data generated by the base image compression unit 3901. Thus, encoded data of only the base image is output, as encoded data of the tile to be encoded, from the image capture unit 105'''. Note that encoded data to be output may be switched by the image capture unit 105''' in accordance with an instruction from the control unit 101, or may be performed by the control unit 101 directly controlling a switch of the image capture unit 105'''.

In step S2404, the control unit 101 determines whether or not the encoding of all of the tiles in the current frame have ended, ends the selection processing if it is determined that the encoding of all of the tiles has ended, and returns the processing to step S2401 if not.

Note that tiles to be regarded as tiles in the peripheral area (or center area) can be stored, in advance, in the ROM 102 in accordance with characteristics of the optical system 104. If the optical system 104 is interchangeable, information regarding tiles to be regarded as those in the peripheral area for each type of interchangeable lens can be stored in the ROM 102. Also, when recording encoded data, the control unit 101 includes information that makes it possible to specify, at the time of decoding, which tiles correspond to the peripheral area (i.e. whether or not only encoded data of the base image is recorded), in header information of a file, for example.

Figure 25A:
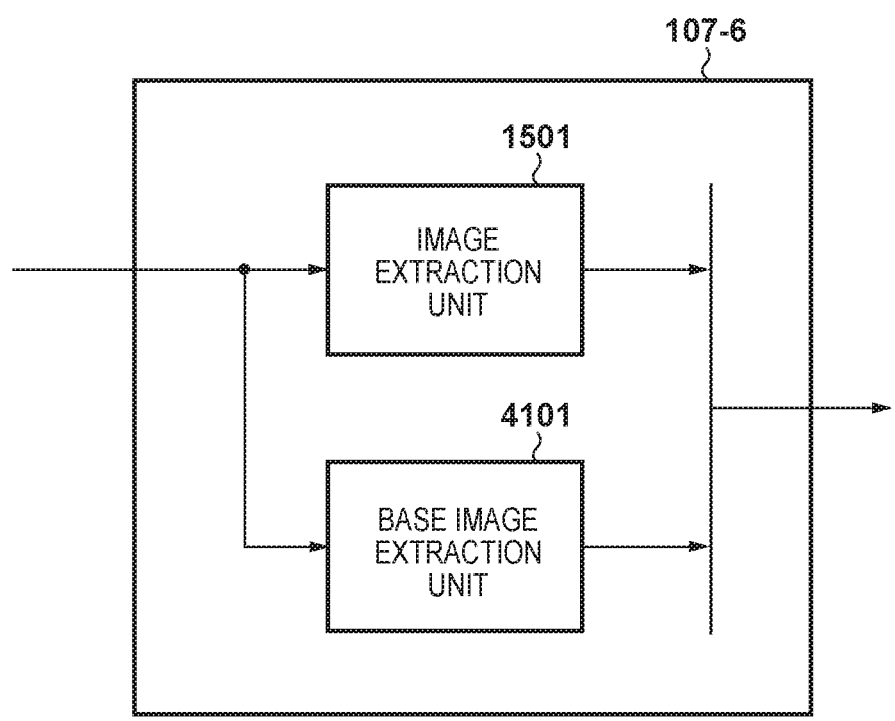
FIGS. 25A to 25C relate to a functional configuration and operations of the image processing unit of the digital camera according to the fifth embodiment.

FIG. 25A is a block diagram illustrating a functional configuration example of an image processing unit 107-6 according to this embodiment. The same constituent elements as those in the second embodiment are assigned the same reference numerals as those in FIG. 16A. The image processing unit 107-6 according to this embodiment is equal to the image processing unit 107-4 according to the second embodiment that includes a base image extraction unit 4101 in place of the image extraction unit 1502.

Figure 25B:
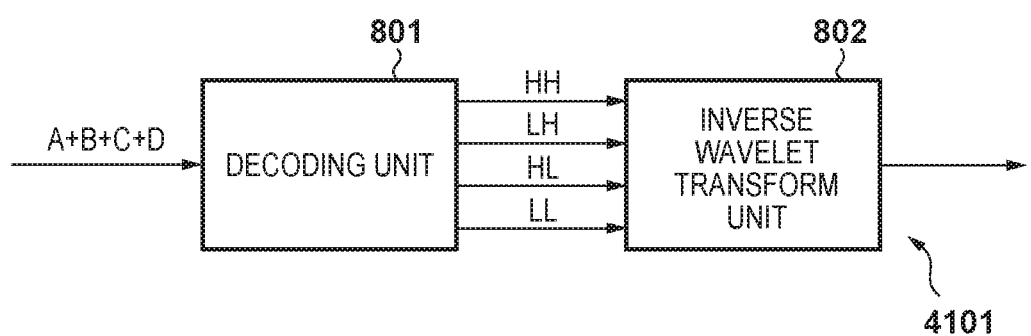

FIG. 25B is a block diagram illustrating a functional configuration example of the base image extraction unit 4101. The base image extraction unit 4101 only has the configuration relating to the base image, out of the configuration of the image processing unit 107 shown in FIG. 6A. However, encoded data of the base image includes not only the scaling coefficient (LL) but also the wavelet expansion coefficients (LH, HL, and HH), and thus, the decoding unit 801 decodes all of the coefficients and supplies the decoded coefficients to the inverse wavelet transform unit 802. The inverse wavelet transform unit 802 then performs inverse wavelet transform on the coefficients supplied from the decoding unit 801.

Figure 25C:
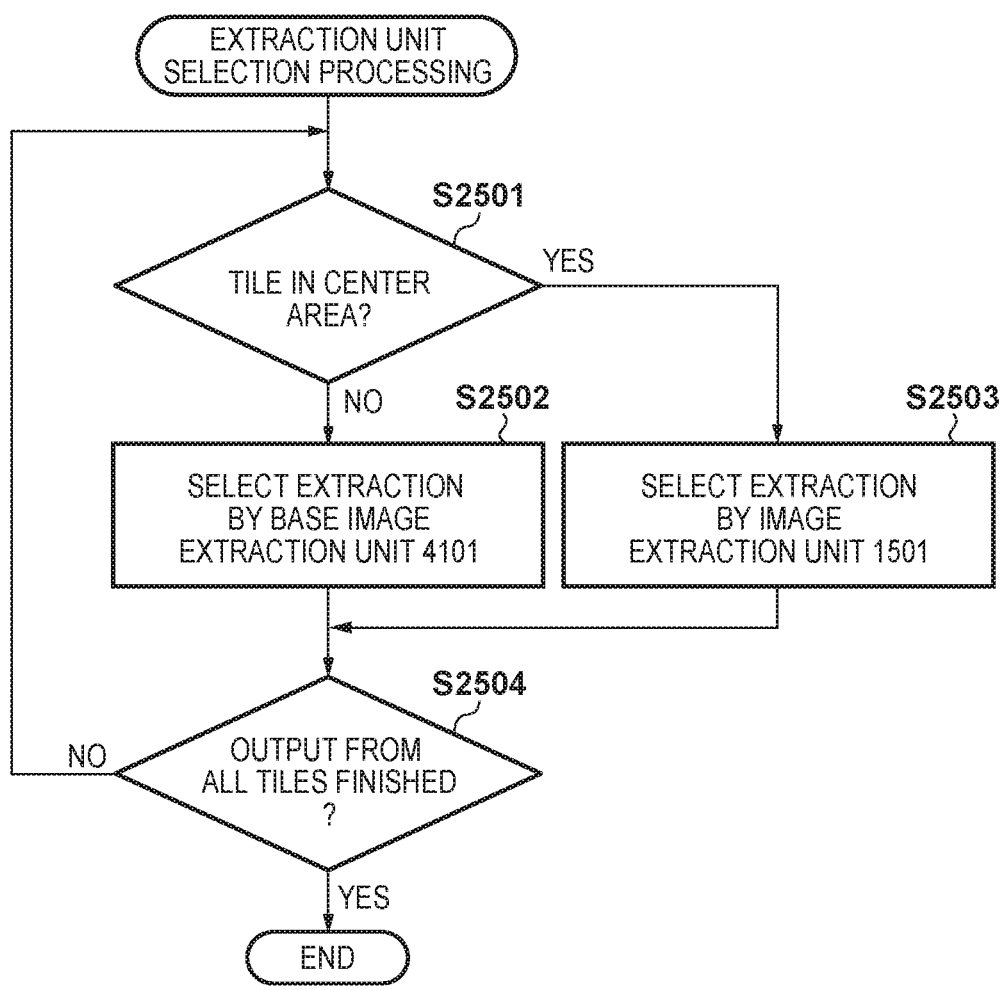

While decoding each frame, the control unit 101 selects the image extraction unit to be used in the image processing unit 107-6, as illustrated in the flowchart in FIG. 25C. That is to say, in step S2501 the control unit 101 determines whether or not a tile to be decoded is a tile in the screen center area. For example, the control unit 101 references header information of a file that includes the encoded data, and thus can determine that the tile to be decoded is a tile in the screen center area (or that the tile to be decoded is not a tile in the image peripheral area). If it is determined that the tile to be decoded is a tile in the screen center area, in step S2503, the control unit 101 instructs the image processing unit 107-6 to output data obtained by the image extraction unit 1501. Thus, data of both the base image and parallax images is output, as the result of decoding the tile to be decoded, from the image processing unit 107-6. On the other hand, if it is not determined that the tile to be decoded is a tile in the screen center area (i.e. if it is determined that the tile to be decoded is a tile in the image peripheral area), in step S2502, the control unit 101 instructs the image processing unit 107-6 to output decoded data obtained by the base image extraction unit 4101. Thus, only the data of the base image is output, as the data of the tile to be decoded, from the image processing unit 107-6. Note that the image extraction unit may be switched by the image processing unit 107-6 in accordance with an instruction from the control unit 101, or may be switched by the control unit 101 directly controlling a switch of the image processing unit 107-6.

According to this embodiment, the peripheral areas of parallax images are not encoded (otherwise, even if they are encoded, the encoded data is not recorded). As a result, the amount of encoded data of multi-viewpoint images can be reduced, in addition to the effects of the first to third embodiments. Note that the configuration of this embodiment can be combined with the configurations of the first to third embodiments.

Sixth Embodiment

Next, the sixth embodiment of the present invention will be described. Note that this embodiment can be carried out by the same functional configuration as that of the digital camera 100 described in the first embodiment. Thus, the sixth embodiment will be described using the same reference numerals as those in the first embodiment.

Figure 26A:
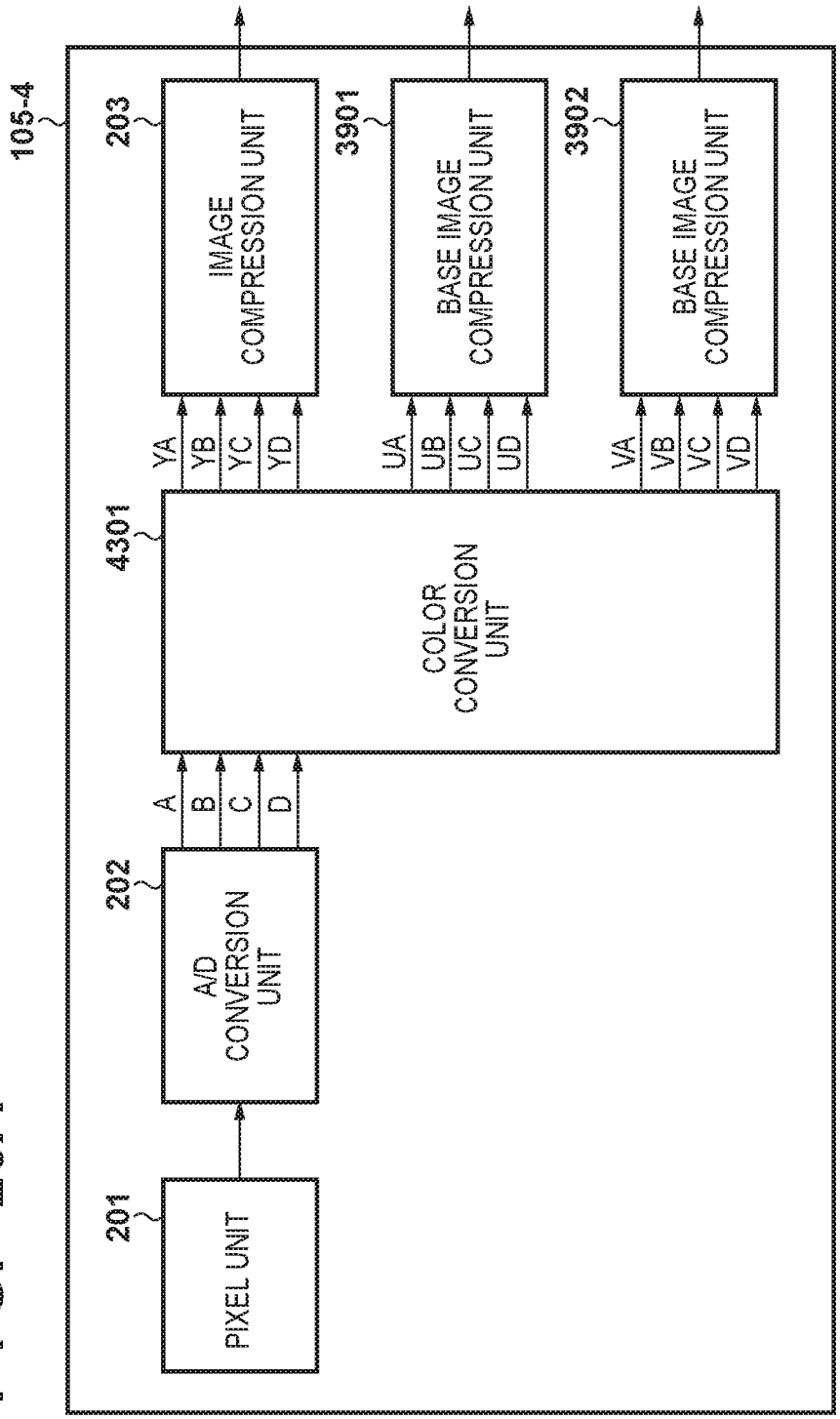
FIGS. 26A and 26B relate to a functional configuration of the image capture unit of the digital camera according to a sixth embodiment.

FIG. 26A is a block diagram illustrating a functional configuration example of an image capture unit 105-4 according to this embodiment. The same constituent elements as those in the first embodiment are assigned the same reference numerals as those in FIG. 2A. The image capture unit 105-4 according to this embodiment has a configuration in which a color conversion unit 4301 and a base image compression unit 3902 are additionally provided in the image capture unit 105''' according to the fifth embodiment. Here, the base image compression unit 3902 has the same configuration as that of the base image compression unit 3901.

Figure 26B:
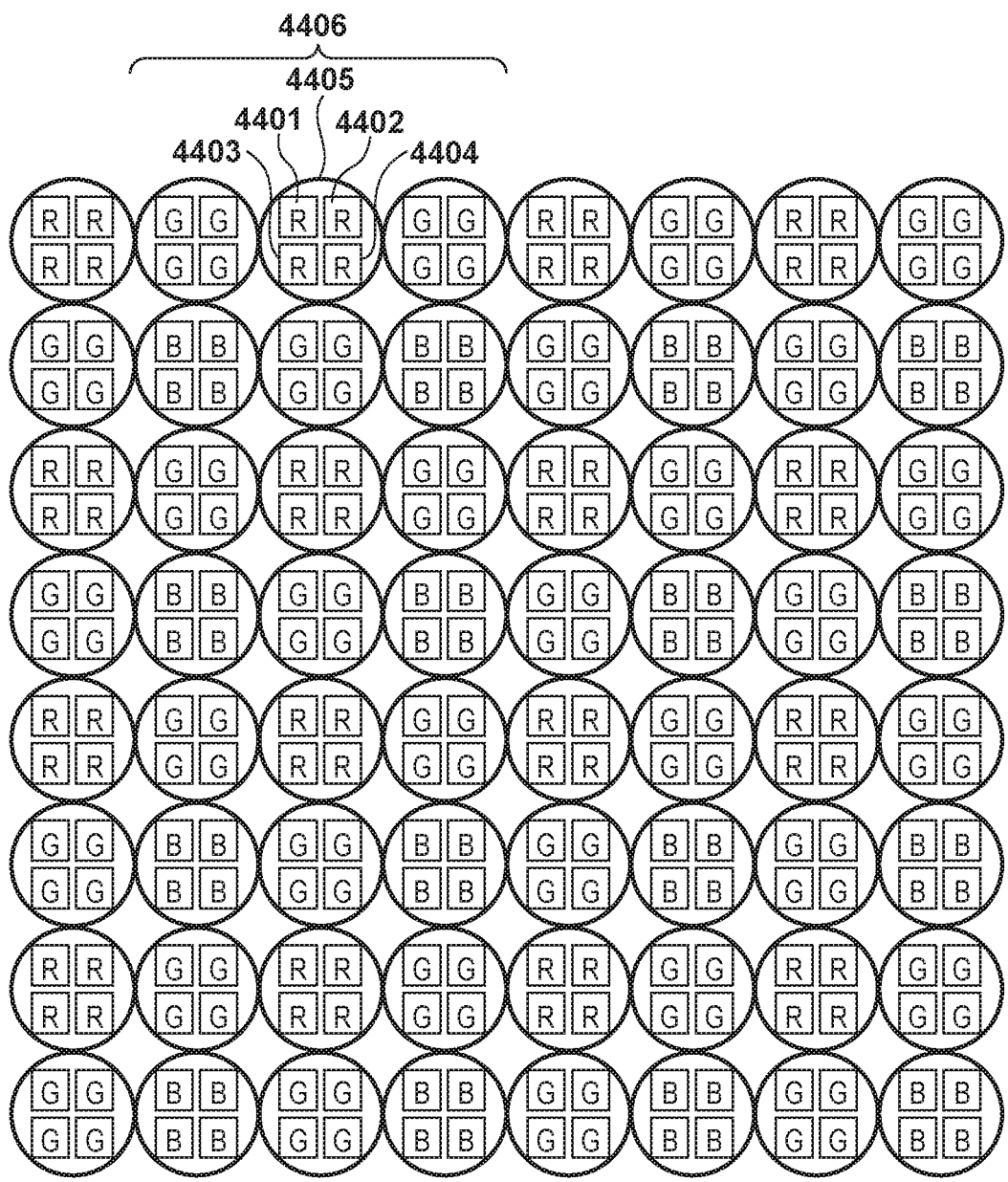

The color conversion unit 4301 converts the format of image data of the images A to D output by the A/D conversion unit 202 from the RGB format to the YUV format. In this embodiment, the pixel unit 201 has a pixel arrangement shown in FIG. 26B. Specifically, the pixel unit 201 has color filters in a primary color Bayer pattern, and each one of the color filters corresponds to one microlens 4405. With this configuration, four photoelectric conversion units 4401, 4402, 4403, and 4404 that share the one microlens 4405 perform photoelectric conversion on a light beam that has passed through a color filter of the same color. Thus, the images A to D are images with a pixel arrangement that is equal to the primary color Bayer pattern.

The color conversion unit 4301 performs debayering (demosaicing) processing on the images A to D so that the respective pixels have RGB components, and then applies known RGB-to-YUV conversion, thereby converting the images A to D to image data in the YUV format. The color conversion unit 4301 then allocates the Y component of the images A to D to the image compression unit 203, the U component to the base image compression unit 3901, and the V component to the base image compression unit 3902.

The visual sense of human eyes is less sensitive to the color difference components (U and V components), than to the luminance component (Y component). Accordingly, as for the luminance component, the image compression unit 203 performs wavelet transform and encoding, similarly to the first embodiment, on the base image (YA+YB+YC+YD) and parallax images (images YA to YD). That is to say, as for the luminance component, only the scaling coefficient (LL) is encoded for the base image, and the wavelet expansion coefficients (HL, LH, and HH) are encoded for the parallax images. On the other hand, as for the color difference components, the base image compression units 3901 and 3902 perform wavelet transform and encoding, similarly to the fifth embodiment, on only the base images of the U and V components (UA+UB+UC+UD and VA+VB+VC+VD), respectively. That is to say, as for the color difference components, all of the coefficients of only the base image are encoded. Thus, encoded data can be reduced by encoding the parallax images only for the luminance component regarding which even a small refocusing effect can be readily recognized visually.

FIG. 27 is a block diagram illustrating a functional configuration example of an image processing unit 107-7 according to this embodiment. The image processing unit 107-7 includes a base image extraction unit 4102, in addition to the image extraction unit 1501 and the base image extraction unit 4101 that are included in the image processing unit 107-6 shown in FIG. 25A. The base image extraction unit 4102 has the same configuration as that of the base image extraction unit 4101. The image extraction unit 1501 performs decoding and inverse wavelet transform on the encoded data of luminance component images (base image and parallax images). The base image extraction units 4101 and 4102 perform decoding and inverse wavelet transform on the encoded data of the base images of the U and V components, respectively.

The parallax images (images YA to YD) of the luminance component obtained by the image extraction unit 1501 is subjected to refocusing (shift-and-add operation) by a shift-and-add operation unit 803", and is supplied, as a refocused image, to an adder unit 804". The adder unit 804" adds the refocused image and the base image (YA+YB+YC+YD) of the luminance component obtained by the image extraction unit 1501, and supplies the result of addition to the color conversion unit 4501. The color conversion unit 4501 performs color conversion on the luminance component image from the adder unit 804" and the base images (UA+UB+UC+UD and VA+VB+VC+VD) of the U and V components obtained by the base image extraction units 4101 and 4102, and generates a base image that has RGB components.

According to this embodiment, only the luminance component are encoded for a plurality of parallax images (viewpoint images), and the luminance component and the color difference components are encoded for the base image, and accordingly, the amount of encoded data can be efficiently reduced.

Other Embodiments

The above first to sixth embodiments can be partially or entirely combined, as appropriate. The first to sixth embodiments have described configurations in which the image capture unit performs sub-band division, encoding, color conversion, and so on. However, a configuration may alternatively be employed in which the image capture unit performs processing up to A/D conversion, and the control unit or the image processing unit performs sub-band division, encoding, color conversion, and so on. Also, sub-band division, encoding, color conversion, and so on in the first to sixth embodiments may not necessarily be performed when an image is captured. For example, the effect of reducing the recording size can also be achieved by performing such processing to RAW data that is already recorded. The first to sixth embodiments have a configuration in which encoding and decoding are performed by the same apparatus, but encoding and decoding may alternatively be performed by different apparatuses. The present invention is not limited to the configurations in the described embodiments. The configurations in the embodiments can be modified and changed in various manners within the scope described in the claims, and all such modifications and changes are included in the present invention.

The above embodiments have a configuration in which the image compression unit and the pixel units are provided in the same semiconductor chip. However, a configuration may alternatively be employed in which a chip for image capturing that includes a pixel unit and a circuit such as an FPGA (field-programmable gate array) that includes the image compression unit are provided independently, and are electrically connected to each other through wiring. In this case, the output from the image compression unit is directed to an image processing unit that is mounted in yet another chip, for example.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-214186, filed on Nov. 6, 2017, which is hereby incorporated by reference herein in its entirety.

What is claimed is:

1. An image processing apparatus comprising:
a processor that executes a program stored in a memory and functions as:
a dividing unit configured to divide a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components; and
an encoding unit configured to encode the plurality of second images and the base image,
wherein, as for the plurality of second images, the encoding unit encodes the sub-band that includes high-frequency components, and, as for the base image, the encoding unit encodes the sub-band that does not include high-frequency components.

2. The image processing apparatus according to claim 1, wherein the encoding unit does not encode one of the plurality of second images, and, as for the base image, the encoding unit encodes the sub-band that does not include high-frequency components and the sub-band that includes high-frequency components.

3. The image processing apparatus according to claim 1, wherein the encoding unit is switchable between performing the encoding while reducing the number of the plurality of second images to be smaller than the number of the plurality of first images, and performing the encoding without reducing the number of the plurality of second images.

4. The image processing apparatus according to claim 3, wherein the encoding unit reduces the number of the plurality of second images to be smaller than the number of the plurality of first images by generating, based on the plurality of first images, the plurality of second images that do not have information regarding parallax in a vertical direction or a horizontal direction.

5. The image processing apparatus according to claim 1, wherein, as for the base image, the encoding unit encodes a difference between a base image to be encoded and a past base image.

6. The image processing apparatus according to claim 1, wherein, as for the plurality of second images, the encoding unit does not encode a predetermined peripheral area.

7. The image processing apparatus according to claim 1, wherein the dividing unit can select a level of the division.

8. The image processing apparatus according to claim 1, wherein the base image is generated by adding at least two of the plurality of first images.

9. An image processing apparatus comprising:
a processor that executes a program stored in a memory and functions as:
a converting unit configured to convert, to a luminance component and a color difference component, a base image corresponding to a plurality of first images captured from different viewpoints, and a plurality of second images each corresponding to one or more of the plurality of first images;
a dividing unit configured to divide the luminance component and the color difference component into a plurality of sub-bands including a sub-band that includes high-frequency components and a sub-band that does not include high-frequency components; and
an encoding unit configured to encode the plurality of second images and the base image,
wherein, as for the base image, the encoding unit encodes the plurality of sub-bands of the color difference component, and encodes the sub-band that does not include high-frequency components of the luminance component, and
as for the plurality of second images, the encoding unit does not encode the color difference component, and encodes the sub-band that includes high-frequency components of the luminance component.

10. The image processing apparatus according to claim 9, wherein the dividing unit can select a level of the division.

11. The image processing apparatus according to claim 10, the processor further functions as:
a control unit configured to select the level of the division performed by the dividing unit,
wherein the control unit selects a first level if a shift amount of the plurality of first images is a first shift amount, and selects a second level that is higher than the first level if the shift amount of the plurality of first images is a second shift amount that is larger than the first shift amount.

12. The image processing apparatus according to claim 11, further comprising:
an optical system; and
wherein the control unit selects the first level if a depth of field of the optical system is a first depth of field, and selects the second level that is higher than the first level if the depth of field of the optical system is a second depth of field smaller than the first depth of field.

13. The image processing apparatus according to claim 9, wherein the base image is generated by adding at least two of the plurality of first images.

14. An image processing apparatus comprising:
a processor that executes a program stored in a memory and functions as:
an acquiring unit configured to acquire encoded data of a sub-band that does not include high-frequency components of a base image corresponding to a plurality of first images captured from different viewpoints, and encoded data of a sub-band that includes high-frequency components of a plurality of second images each corresponding to one or more of the plurality of first images;
a generating unit configured to generate a refocused image using the plurality of first images that have been restored using the encoded data of the plurality of second images; and
an adding unit configured to add the refocused image to the base image obtained by decoding the encoded data of the base image.

15. The image processing apparatus according to claim 14, wherein, as for the base image, the acquiring unit acquires the encoded data of the sub-band that includes high-frequency components, and uses the acquired encoded data as encoded data of one of the plurality of second images.

16. The image processing apparatus according to claim 14, wherein the generating unit restores the sub-bands of the plurality of first images, and thereafter performs a shift-and-add operation on the plurality of first images to generate the refocused image.

17. The image processing apparatus according to claim 14, wherein the plurality of second images are equal to the plurality of first images, and
the generating unit generates the refocused image by performing a shift-and-add operation on the encoded data of the plurality of second images, and thereafter restoring the sub-bands.

18. The image processing apparatus according to claim 14, wherein the base image is generated by adding at least two of the plurality of first images.

19. An image capture apparatus comprising:
an image sensor comprising a plurality of photoelectric conversion units configured to receive a light beam from an optical system and output a plurality of analog image signals from different viewpoints;
an image processing apparatus configured to encode a base image and a plurality of second images, based on a plurality of first images output from the image sensor; and
a recording unit configured to record, to a memory, encoded data that has been encoded by the image processing apparatus,
the image processing apparatus comprising:
a processor that executes a program stored in a memory and functions as:
a dividing unit configured to divide the base image corresponding to a plurality of first images captured from different viewpoints, and the plurality of second images each corresponding to one or more of the plurality of first images, into a plurality of sub-bands including a sub-band that includes high-frequency components and a sub-band that does not include high-frequency components; and an encoding unit configured to encode the plurality of second images and the base image, wherein, as for the plurality of second images, the encoding unit encodes the sub-band that includes high-frequency components, and, as for the base image, the encoding unit encodes the sub-band that does not include high-frequency components.

20. The image capture apparatus according to claim 19, further comprising:

an image processing circuit configured to decode the encoded data that has been encoded by the encoding unit and recorded to the memory, and perform image processing using parallax between the plurality of first images.

21. An image sensor comprising:

a first semiconductor substrate comprising a plurality of photoelectric conversion units configured to receive a light beam from an optical system and output a plurality of analog image signals from different viewpoints; and a second semiconductor substrate comprising an image processing apparatus configured to encode a base image and a plurality of second images, the base image and the plurality of second images being generated based on the plurality of analog image signals, the first semiconductor substrate and the second semiconductor substrate being stacked together, the image processing apparatus comprising:

a processor that executes a program stored in a memory and functions as:

a dividing unit configured to divide the base image corresponding to a plurality of first images captured from different viewpoints, and the plurality of second images each corresponding to one or more of the plurality of first images, into a plurality of sub-bands including a sub-band that includes high-frequency components and a sub-band that does not include high-frequency components; and an encoding unit configured to encode the plurality of second images and the base image, and wherein, as for the plurality of second images, the encoding unit encodes the sub-band that includes high-frequency components, and, as for the base image, the encoding unit encodes the sub-band that does not include high-frequency components.

22. An image processing method to be performed by an image processing apparatus, the method comprising:

dividing a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components; and encoding the plurality of second images and the base image, wherein, during the encoding, as for the plurality of second images, the sub-band that includes high-frequency components is encoded, and, as for the base image, the sub-band that does not include high-frequency components is encoded.

23. An image processing method to be performed by an image processing apparatus, the method comprising:

converting, to a luminance component and a color difference component, a base image corresponding to a plurality of first images captured from different viewpoints, and a plurality of second images each corresponding to one or more of the plurality of first images;

dividing the luminance component and the color difference component into a plurality of sub-bands including a sub-band that includes high-frequency components and a sub-band that does not include high-frequency components; and encoding the plurality of second images and the base image, wherein, during the encoding, as for the base image, the plurality of sub-bands of the color difference component are encoded, and the sub-band that does not include high-frequency components of the luminance component is encoded, and as for the plurality of second images, the color difference component is not encoded, and the sub-band that includes high-frequency components of the luminance component is encoded.

24. An image processing method to be performed by an image processing apparatus, the method comprising:

acquiring encoded data of a sub-band that does not include high-frequency components of a base image corresponding to a plurality of first images captured from different viewpoints, and encoded data of a sub-band that includes high-frequency components of a plurality of second images each corresponding to one or more of the plurality of first images;

generating a refocused image using the plurality of first images that have been restored using the encoded data of the plurality of second images; and adding the refocused image to the base image obtained by decoding the encoded data of the base image.

25. A non-transitory computer-readable medium storing a command that can be executed by a computer, wherein the command, upon being executed by the computer, causes the computer to function as an image processing apparatus comprising:

dividing unit for dividing a base image corresponding to a plurality of first images captured from different viewpoints, and a plurality of second images each corresponding to one or more of the plurality of first images, into a plurality of sub-bands including a sub-band that includes high-frequency components and a sub-band that does not include high-frequency components; and encoding unit for encoding the plurality of second images and the base image, wherein, as for the plurality of second images, the encoding unit encodes the sub-band that includes high-frequency components, and, as for the base image, the encoding unit encodes the sub-band that does not include high-frequency components.

26. A non-transitory computer-readable medium storing a command that can be executed by a computer, wherein the command, upon being executed by the computer, causes the computer to function as an image processing apparatus comprising:

converting unit for converting, to a luminance component and a color difference component, a base image corresponding to a plurality of first images captured from different viewpoints, and a plurality of second images each corresponding to one or more of the plurality of first images;

dividing unit for dividing the luminance component and the color difference component into a plurality of sub-bands including a sub-band that includes high-frequency components and a sub-band that does not include high-frequency components; and encoding unit for encoding the plurality of second images and the base image, wherein, as for the base image, the encoding unit encodes the plurality of sub-bands of the color difference component, and encodes the sub-band that does not include high-frequency components of the luminance component, and as for the plurality of second images, the encoding unit does not encode the color difference component, and encodes the sub-band that includes high-frequency components of the luminance component.

27. A non-transitory computer-readable medium storing a command that can be executed by a computer, wherein the command, upon being executed by the computer, causes the computer to function as an image processing apparatus comprising:

acquiring unit for acquiring encoded data of a sub-band that does not include high-frequency components of a base image corresponding to a plurality of first images captured from different viewpoints, and encoded data of a sub-band that includes high-frequency components of a plurality of second images each corresponding to one or more of the plurality of first images;

generating unit for generating a refocused image using the plurality of first images that have been restored using the encoded data of the plurality of second images; and adding unit for adding the refocused image to the base image obtained by decoding the encoded data of the base image.

* * * * *